United States Patent
Fischer

(10) Patent No.: US 11,585,542 B2
(45) Date of Patent: Feb. 21, 2023

(54) METHOD FOR MAINTAINING THE TEMPERATURE OF FLUID MEDIA

(71) Applicant: Swisspor Management AG, Steinhausen (CH)

(72) Inventor: Ludger Fischer, Zug (CH)

(73) Assignee: Swisspor Management AG, Steinhausen (CH)

( * ) Notice: Subject to any disclaimer, the term of this patent is extended or adjusted under 35 U.S.C. 154(b) by 860 days.

(21) Appl. No.: 16/477,005

(22) PCT Filed: Jan. 26, 2018

(86) PCT No.: PCT/EP2018/051920
§ 371 (c)(1),
(2) Date: Jul. 10, 2019

(87) PCT Pub. No.: WO2018/138241
PCT Pub. Date: Aug. 2, 2018

(65) Prior Publication Data
US 2019/0353356 A1    Nov. 21, 2019

(30) Foreign Application Priority Data
Jan. 30, 2017 (EP) .................................... 17153846

(51) Int. Cl.
*F16L 9/14* (2006.01)
*F24D 11/00* (2022.01)
(Continued)

(52) U.S. Cl.
CPC ............ *F24D 11/005* (2013.01); *C09K 5/063* (2013.01); *F16L 53/32* (2018.01); *F16L 59/023* (2013.01);
(Continued)

(58) Field of Classification Search
CPC .... F24D 11/005; F24D 17/0005; F16L 53/32; F16L 59/023; F16L 59/024;
(Continued)

(56) References Cited

U.S. PATENT DOCUMENTS 3,812,886 A * 5/1974 Hallwood ................ F16L 59/08
138/149
4,003,426 A * 1/1977 Best ...................... F28D 20/023
52/173.3
(Continued)

FOREIGN PATENT DOCUMENTS

| CN | 2573836 | 9/2003 |
| CN | 205740871 | 11/2016 |

(Continued)

OTHER PUBLICATIONS

"JIS A 9504:2011 Man made mineral fibre thermal insulation materials", Dec. 31, 2011.
(Continued)

*Primary Examiner* — James F Hook
(74) *Attorney, Agent, or Firm* — Defillo & Associates, Inc; Evelyn A Defillo

(57) ABSTRACT

The invention relates to a method for maintaining the temperature of fluid media in pipes even in the event of an interruption of the fluid media flow. In a first step, a heat reservoir layer (1) is produced comprising a latent heat reservoir material (2) and a matrix material (3). In a second step, the heat reservoir layer (1) is either arranged around a pipe (4) and subsequently encased with a heat damping material (5) or the heat reservoir layer (1) is brought into contact with heat damping material (5), whereby a heat reservoir damper composite (51) is obtained, and the pipe (4) is then encased with the heat reservoir damper composite (51) such that the heat reservoir layer (1) of the heat reservoir damper composite (51) lies between the pipe (4)

(Continued)

and the heat damping material (5) of the heat reservoir damping composite (51).

19 Claims, 6 Drawing Sheets

(51) Int. Cl.
    *F16L 53/32*     (2018.01)
    *C09K 5/06*     (2006.01)
    *F16L 59/02*     (2006.01)
    *F16L 59/04*     (2006.01)
    *F16L 59/08*     (2006.01)
    *F24D 17/00*     (2022.01)
    *F28D 20/02*     (2006.01)

(52) U.S. Cl.
CPC ........... *F16L 59/024* (2013.01); *F16L 59/027* (2013.01); *F16L 59/04* (2013.01); *F16L 59/08* (2013.01); *F24D 17/0005* (2013.01); *F28D 20/023* (2013.01); *F28F 2270/00* (2013.01)

(58) Field of Classification Search
CPC ......... F16L 59/027; F16L 59/04; F16L 59/08; C09K 5/063; F28D 20/023; F28F 2270/00
USPC ........................................................ 138/149
See application file for complete search history.

(56) References Cited

U.S. PATENT DOCUMENTS

| | | | | |
|---|---|---|---|---|
| 4,111,189 A * | 9/1978 | Dizon | .................... | F28D 20/025 126/714 |
| 4,377,458 A * | 3/1983 | Watanabe | .................. | C08J 5/24 428/458 |
| 4,570,679 A * | 2/1986 | Schippl | .................. | F16L 59/141 138/148 |
| 5,804,297 A * | 9/1998 | Colvin | .................. | F28D 20/023 428/407 |
| 6,000,438 A | 12/1999 | Ohrn | | |
| 6,319,599 B1 * | 11/2001 | Buckley | .................. | C09K 5/063 36/83 |
| 6,403,180 B1 * | 6/2002 | Barrall | ...................... | B32B 1/08 428/36.5 |
| 6,415,868 B1 * | 7/2002 | Janoff | .................... | F28D 20/023 166/57 |
| 2009/0294094 A1 * | 12/2009 | Suzuki | .................. | F28D 20/023 165/10 |
| 2010/0126618 A1 * | 5/2010 | D'Souza | ................. | C04B 26/04 428/313.9 |
| 2011/0000572 A1 * | 1/2011 | Ramaswamy | ............ | B32B 1/08 138/109 |

FOREIGN PATENT DOCUMENTS

| | | |
|---|---|---|
| DE | 10256553 | 6/2004 |
| EP | 2712893 | 4/2014 |
| JP | S60107494 | 7/1985 |
| JP | H02176300 | 7/1990 |
| JP | H03134397 | 6/1991 |
| WO | WO2002016733 | 2/2002 |
| WO | WO2002062918 | 8/2002 |
| WO | WO2011161472 | 12/2011 |
| WO | WO2012175994 | 12/2012 |

OTHER PUBLICATIONS

"JIS A 9511:2006R Preformed cellular plastics thermal insulation materials", Dec. 31, 2011.

* cited by examiner

METHOD FOR MAINTAINING THE TEMPERATURE OF FLUID MEDIA

CROSS REFERENCE TO RELATED APPLICATION

This application is a national stage entry of PCT/EP2018/051920 filed Jan. 26, 2018, under the International Convention and claiming priority over European Patent Application No. EP17153846.5 filed Jan. 30, 2017.

FIELD OF THE INVENTION

The present invention relates to a method for maintaining the temperature of fluid media in pipes even in the event of an interruption of the fluid media flow, a heat reservoir insulation composite obtainable by the method and a pipe encased by the method, a heat retention system for hot water conduits and/or cold retention system for cold water conduits in residential and office buildings and process facilities, as well as the use of the heat reservoir insulation composite and the encased pipe.

BACKGROUND OF THE INVENTION

Residential and office buildings are usually equipped with cold and hot water conduits. While the temperature of the cold water in cold water conduits is typically not adjusted, the hot water must be heated so that it is perceived as hot water even after being transported in the hot water conduit system once the hot water tap has been opened. Since even in multi-storey buildings the hot water is often heated centrally, for example in the cellar, and is distributed from there throughout the residence, the hot water conduits must be well insulated to reduce heat loss during transport.

In buildings, hot water is typically needed at most for a few minutes for each water extraction. Subsequently, the water in the hot water conduit cools again despite heat insulation, i.e. thermal insulation. Therefore, when turning on a hot water tap, it often takes some time for the outflowing water to get warm. To prevent this, it is sometimes prescribed normatively that hot water conduits must be kept warm, for example by means of a circulation system or pipe trace heating.

In the circulation system permanently reheated hot water is pumped in a conduit parallel to the hot water conduit—for example in a double sheathed conduit or a return conduit—by means of circulation pump in order to keep the water temperature of the hot water conduit at the desired temperature, even if the media flow is interrupted for some time.

In the case of pipe trace heating, an electrical resistance, for example in the form of a cable or electrical heating tape, is wound around the pipe or guided along the pipe. By applying electrical voltage, the cable or heating tape and thus the pipe is electrically heated. In this case, sensors for temperature control can also be provided.

The circulation system, in particular with double sheathed conduit or return conduit, and the electrical pipe trace heating are what are known as active heat retention systems. They are technically complex to produce and very energy-consuming in use and thus costly, even if no hot water is used. They also have the disadvantage that in case of faults in the cable routing (cable break, for example by thermal expansion of the pipeline, aging of the cable insulation, etc.) structural damage can occur and the function is interrupted along the entire conduit. In addition, there is a risk that, in the event of breakage of the electrical pipe trace heating, the electrical voltage can lead to glowing fires and/or endanger people or even cause damage at remote locations, for example via the metal pipeline. These systems—and the electric trace heating in particular—consume a great deal of electrical energy, which in addition is much more valuable than thermal energy. Therefore, not least for reasons of environmental protection, they should be avoided whenever possible.

For reasons of hygiene, cold water conduits should be kept below 25° C., since a warming above 25° C. leads to an increase of human pathogenic germs, in particular *legionella* bacteria. In residential and office buildings, however, cold water conduits are nowadays not generally cooled, due to a lack of simple, suitable solutions, and rely only on the low temperatures of the mains water on the input side of the conduit to the building.

SUMMARY OF THE INVENTION

The object of the present invention is therefore to provide a passive heat retention system for hot water conduits and a passive cold retention system for cold water conduits in residential and office buildings. The passive heat retention system should allow the water temperature in hot water conduits to remain warm without external energy supply even hours after a water withdrawal. The passive cold retention system is also designed to ensure that the water temperature of cold water remains cold even with warm outdoor temperatures and for hours after a water withdrawal, i.e. does not exceed 25° C. This is to prevent *legionella* growth in the hot/cold water conduits. In addition, the passive heat/cold retention system should also be easy to cut to size at the construction site and easily attached to the hot or cold water conduit on site. It should also be possible to easily provide the heat retention system with thermal insulation.

The problem could be solved surprisingly with a method for maintaining the temperature of fluid media in pipes even if the fluid media flow is interrupted, wherein the pipes are suitable for building and home technology, building construction and chemical and process facilities, characterised in that:

a) in a first step, a heat reservoir layer (1) is produced comprising at least one latent heat reservoir material (2) and at least one matrix material (3), wherein, if the latent heat reservoir material (2) is present in the matrix material (3) in micro-encapsulated form, the matrix material (3) is not a thermal insulation material (5), and b) in a second step, the heat reservoir layer (1) either b1) is arranged around a pipe (4) and then the pipe (4) covered by the heat reservoir layer (1) is encased by thermal insulation material (5), whereby an encased pipe (41) is obtained, or b2) the heat reservoir layer (1) is brought into contact with thermal insulation material (5), whereby a heat reservoir insulation composite (51) is obtained, and then the pipe (4) is encased by the heat reservoir insulation composite (51) so that the heat reservoir layer (1) of the heat reservoir insulation composite (51) comes to rest between the pipe (4) and the thermal insulation material (5) of the heat reservoir insulation composite (51).

Also claimed is a heat reservoir insulation composite (51) obtainable by the method according to the invention and suitable for building and home technology and for process facilities.

In addition, an encased pipe (41) obtainable by the method according to the invention, or a pipe (4) encased by the heat reservoir insulation composite (51) according to the invention and suitable for building and home technology as well as for process facilities is also claimed.

Also claimed is a passive heat retention system for hot water conduits and/or cold retention system for cold water conduits in residential and office buildings and for chemical and process facilities comprising at least one encased pipe (41) according to the invention and/or pipe (4) encased by the heat reservoir insulation composite (51) according to the invention.

Also, the use of the heat reservoir insulation composite (51) according to the invention and/or the heat reservoir insulation composite (51) obtainable by the method according to the invention for maintaining the temperature of fluid media in pipes, even in the event that the fluid media flow is interrupted, in particular in building and home technology, in building construction such as in residential and office buildings, as well as in chemical and process facilities is claimed.

Claimed is also the use of the pipe (4) encased by the heat reservoir insulation composite (51) according to the invention and/or the encased pipe (41) according to the invention for keeping fluid media warm, in particular as hot water conduit in buildings, steam conduits, conduits for the transport of chemicals, bitumen, silicones, hot melt adhesives, and/or foods such as chocolate, and/or for keeping fluid media cool, in particular pressurised fluid media, gases and/or liquids, in particular cooling liquids, chemicals, solvents with high vapour pressure and/or foods such as milk products and beverages.

DETAILED DESCRIPTION OF THE INVENTION

Figure 1:
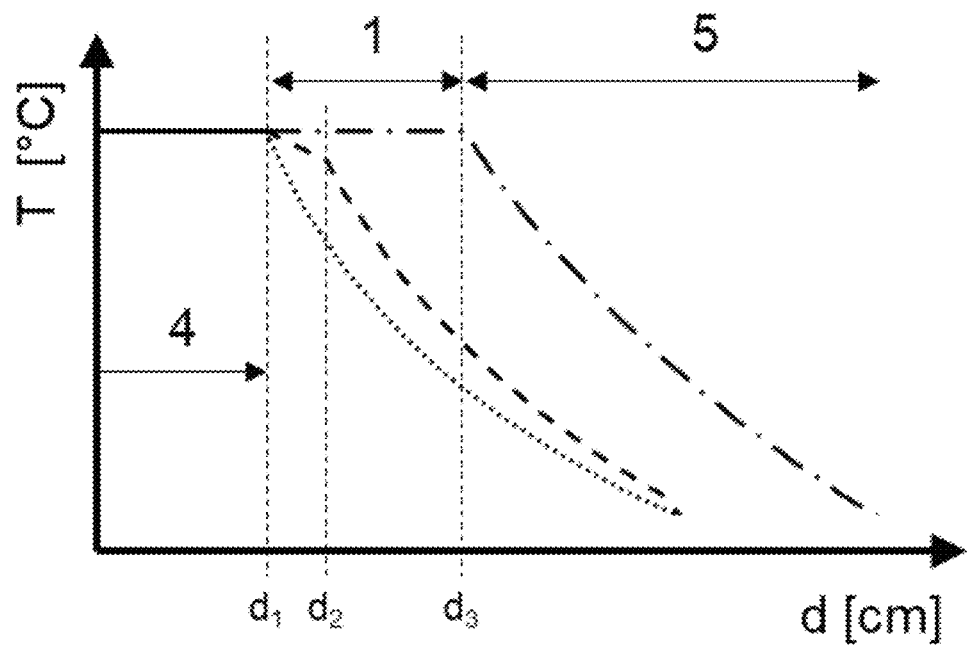
FIG. 1 shows, by way of example, the logarithmically decreasing temperature profile of a warm, fluid medium along the radius of a pipe (4) with thermal insulation material (5) from inside the pipe (4) to the pipe wall (marked $d_1$) and further through the thermal insulation material (5) to the outside.

The method according to the invention, the heat reservoir insulation composite (51) according to the invention, the encased pipe (41) according to the invention, the passive heat retention system for hot water conduits and/or cold retention system for cold water conduits—hereinafter abbreviated as heat/cold retention system for hot/cold water conduits—in residential and office buildings and in process facilities and the uses according to the invention surprisingly have many advantages. Thus, in a simple manner, a durable passive temperature-maintaining system can be used for— compared to the surrounding environment—increased or decreased temperatures, i.e. a heat retention system or a cold retention system, which can be used not only for hot and/or cold water conduits in residential and office buildings, but—depending on the selected phase transition temperature of the latent heat reservoir material (2)—also for higher temperatures of the fluid medium, such as 125° C. for example for steam conduits.

Because the fluid medium should no longer be conveyed, whereby the medium temperature decreases despite the thermal insulation, the latent heat reservoir material (2) delivers enthalpy of fusion to the surrounding environment and to the medium situated in the pipe (4) by the phase conversion from liquid to solid. As a result, with optimal heat conduction of the pipe wall, the medium temperature of the medium in the pipe is maintained at the melting temperature and only decreases when substantially all the latent heat reservoir material (2) is frozen, i.e. when the phase transition from liquid to solid is complete. As a result, the temperature of the fluid medium can be maintained substantially at the phase-change temperature of the latent heat reservoir material (2) passively, i.e. without additional energy feed or removal, even in the event that the fluid media flow is interrupted over a longer time—for example over hours. Consequently, with the heat/cold retention system for hot/cold water conduits according to the invention, in particular in residential and office buildings and in process facilities, the energy-intensive circulation systems and pipe trace heating systems surprisingly can be dispensed with. In addition, retrofitting existing hot/cold water conduits with the passive heat/cold retention system according to the invention is possible at any time in a simple manner, in particular if the hot/cold water conduits are arranged in a—for example walk-in—conduit shaft. The passive cold retention system for cold water also allows the problem-free cold retention of water in cold water conduits, which is usually not practiced from an energy point of view. Due to the lower temperature, possible disease germs in cold water conduits are increased much more slowly. As a result, the water taken from such conduits has a lower content of germs, which is a positive health aspect.

Surprisingly, the method according to the invention, the heat reservoir insulation composite (51) according to the invention, the encased pipe (41) according to the invention, the passive heat/cold retention system for hot/cold water conduits and the uses according to the invention with a suitable selection of the latent heat reservoir material (2) can be used for maintaining the temperature of heated or warmed fluid media, such as in steam conduits or hot water conduits in buildings, as well as cold fluid media, such as in refrigeration systems. In addition, the heat reservoir insulation composite (51), the encased pipe (41) according to the invention and thus the passive heat/cold retention system for hot/cold water conduits surprisingly can be well cut to size both at the factory and on-site with tools available locally.

Thus, due to the present invention, surprisingly and in a simple, low-energy manner, temperatures of fluid media in pipes can be maintained substantially at the phase-change temperature of the used latent heat reservoir material (2) over an extremely widely selectable temperature range, also for hours or even days without energy being added or removed, i.e. passively and thus also without recirculation, without a double jacket and without electrical heat tracing or electrically operated Peltier elements, even if the fluid medium no longer flows—or not continuously.

The method according to the invention, the heat reservoir insulation composite (51) according to the invention and the encased pipe (41) according to the invention can thus be used surprisingly in a very versatile manner according to the uses according to the invention, such as in hot water conduits in buildings, and in heating and cooling systems. Thus, a simple, energy-efficient temperature protection is also provided, for example in the event of disturbances in chemical operations and/or pumping of temperature-critical fluid media. In addition, the heat reservoir insulation composite (51) and the encased pipe (41) according to the invention can be cut to the required size in a simple manner—typically on site—without leakage of latent heat reservoir material (2)—moreover also at temperatures which are above the melting temperature of the latent heat reservoir material (2).

Surprisingly, not only is the method according to the invention easily carried out, but the heat reservoir insulation composite (51) according to the invention is also surprisingly easy to use on-site. Thus, to install a heat retention system, there is no longer any need for an additional step to be performed, as was previously the case, and instead the pipe (4) can be encased by the heat reservoir insulation composite (51), instead of the thermal insulation as was the case before.

The heat reservoir layer (1) as well as the heat reservoir insulation composite (51) can be cut to size if necessary in a simple manner, even without latent heat reservoir material (2) leaking from the heat reservoir layer (1)—either alone or in conjunction with the thermal insulation material (5), and thus as heat reservoir insulation composite (51). In other words, the heat reservoir layer (1) and the heat reservoir insulation composite (51) do not bleed at all or at the most insignificantly, even if they are cut to size.

Surprisingly, the passive heat retention system according to the invention for hot water conduits and/or the passive cold retention system according to the invention for cold water conduits in residential and office buildings and for chemical and process facilities allows a hot or cold water temperature to be maintained over many hours or even days, without the need for an active energy feed. This allows a significant energy reduction in residential and office buildings as well as in chemical and process facilities. In addition, the simple and maintenance-free operation of the passive heat/cold retention system for hot/cold water conduits also allows installation in houses and buildings in which no heat/cold retention system has been installed so far. This significantly reduces water consumption.

In the literature, pipelines, in particular deep-sea pipelines for the extraction of crude oil, which inter alia are surrounded with a phase-change material, are often described. The phase-change material serves to extend the cooling time and to prevent the solidification of the medium flowing in the pipeline, in particular of crude oil.

Figure 2:
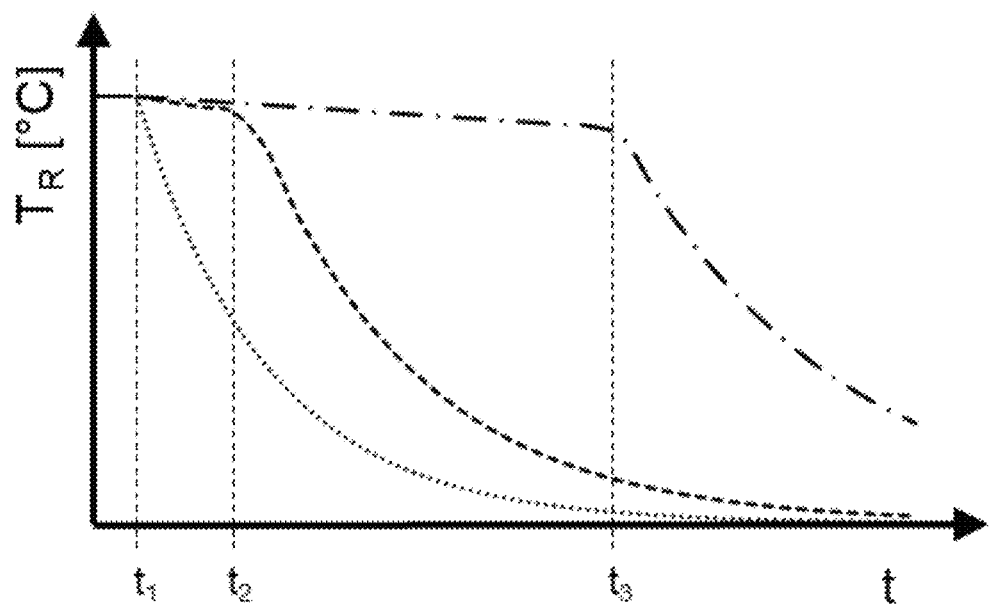
FIG. 2 shows, analogously to FIG. 1, the exponentially decreasing temperature profile $T_R$ in the case of flow interruption within the pipe (4)

Thus, U.S. Pat. No. 6,000,438 describes a deep-sea pipeline with passive insulation with improved transient heat-loss properties. The pipeline is equipped with thermal insulation in which a dispersed or microencapsulated phase-change material is incorporated. In the event of an interruption to the flow within the pipeline, the cooling time of the produced or conveyed hydrocarbon liquid thus can be greatly extended. A disadvantage of thermal insulation containing dispersed or microencapsulated phase-change material is the reduced thermal insulation function. In addition, only the part of the phase-change material that is in the region of the conveyed hydrocarbon, i.e. in the vicinity of the pipeline pipe, is used for the extended cooling time. However, the majority of the phase-change material contained in the thermal insulation is below the phase-change temperature of the phase-change material and therefore cannot extend the cooling time. On the other hand, due to an increased thermal conductivity, which is due to the presence of the thermally conductive phase-change material, the thermal insulation is reduced (FIGS. 1 and 2).

WO-A-2011/161472 describes a passive thermal management system for underwater pipelines for transporting liquids such as crude oil away from an underwater drill head, for example. In this case, the crude oil during the conveying has a temperature of about 50° C. to 90° C., while the temperature of the seawater in the surrounding environment is about 0° C. However, if the temperature of the crude falls below about 25° C., it may solidify and clog the pipeline. Therefore, the passive thermal management system comprises a phase-change material having a melting point selected so that, when the transport of the crude oil is interrupted, the heat from the phase-change layer is transferred to the cooling crude oil, whereby the crude oil remains in the liquid state for longer.

WO-A-2012/175994 relates to a device and method for maintaining the temperature in particular of crude oil in an underwater pipeline. In this case, a material with a high latent heat during phase change is used to deliver latent heat to the fluid when the fluid temperature decreases in the direction of a threshold value. The material can be encased by an insulating tape. There is no mention of a matrix comprising a matrix material or a phase-change material or a thermal insulation material.

WO-A-02/062918 describes a method for producing a quasi-incompressible phase-change material with shear-thinning properties and a low thermal conductivity. For this purpose, the phase-change material consisting of a mixture of selected chemical compounds in liquid phase is mixed with a bulky polymer as a texturizing agent. The texturizing agent gives the phase-change material a gel-like consistency without shearing stress, but under shear stress it liquefies again. The gelled phase-change material is used for heat insulation of conduits such as hydrocarbon transport lines, in particular deep-sea crude oil pipelines. There is no mention of an encasement of such lines, surrounded by gelled phase-change material, with thermal insulation material.

EP-A-2 712 893 describes a method for producing pipelines, in particular off-shore pipelines, with heat-retaining properties. In this case, an organic polyisocyanate is mixed with at least one polymeric compound having at least two hydrogen atoms reactive to isocyanate, a catalyst, wax and optionally further additives to form a reaction mixture, is applied to a pipe and is reacted to form a polyurethane layer.

There is no mention of thermal insulation materials, in particular thermal insulation materials which surround the pipeline with the reacted reaction mixture.

WO-A-02/16733 describes a temperature control device for preventing the formation of alkane hydrates in an underwater oil and gas production process, especially in a Sub-sea Christmas Tree. The device comprises a housing and a phase-change material, which is arranged in the housing. The phase-change material has a phase transition temperature that is higher than the temperature at which alkane hydrates are formed. In this case, the phase-change material is used as such, without being embedded or encapsulated in a matrix. In addition, there is no mention of thermal insulation materials.

These devices and methods for pipelines for crude oil, especially for deep-sea crude oil production, are not suitable for residential and office buildings or for overground lines. This is because deep-sea pipelines and equipment used for that purpose, amongst other things, must be able to withstand a high water pressure and must be very resistant to external mechanical damage. Also, crude oil pipelines have a complex structure and much larger dimensions than water conduits in residential and office buildings. In addition, thermal insulation materials as used in accordance with the invention are not suitable for deep-sea applications, since they would be destroyed or at least strongly compressed due to the forces acting on the thermal insulation materials, which would destroy the thermal insulation properties.

The Method

The method according to the invention serves to hold, i.e. stabilise the temperature of fluid media in pipes, even in the event that the flow of the fluid media flowing through the pipes is interrupted, wherein the pipes are suitable for building and home technology, building construction—and thus for residential and office buildings—as well as for chemical and process facilities, and therefore are a preferred part of building and home technology, building construction and chemical and process facilities. Thus, the method relates to overground lines, especially of residential and office buildings and chemical and process facilities.

The method according to the invention, the heat reservoir insulation composite (51) and the encased pipe (41) are not suitable for equipment and pipelines of the petroleum and natural gas industry and thus not for the conveying of crude oil, especially not for deep-sea crude oil promotion.

The term "fluid media", also referred to as fluid or just medium, in accordance with the invention comprises any media which are flowable at the temperature prevailing in the pipe at the time of transport and thus transportable. Non-limiting examples of such fluid media include in particular gases, liquids, suspensions, slurries, dispersions, emulsions and/or mixtures thereof. In the sense of the invention, however, crude oil is not preferred as a fluid medium.

In a first step a) of the method according to the invention, a heat reservoir layer (1) is produced, wherein the heat reservoir layer (1) comprises at least one latent heat reservoir material (2) and at least one matrix material (3), wherein, if the latent heat reservoir material (2) is in microencapsulated form, the matrix material (3) is not a thermal insulation material (5).

Figure 4:
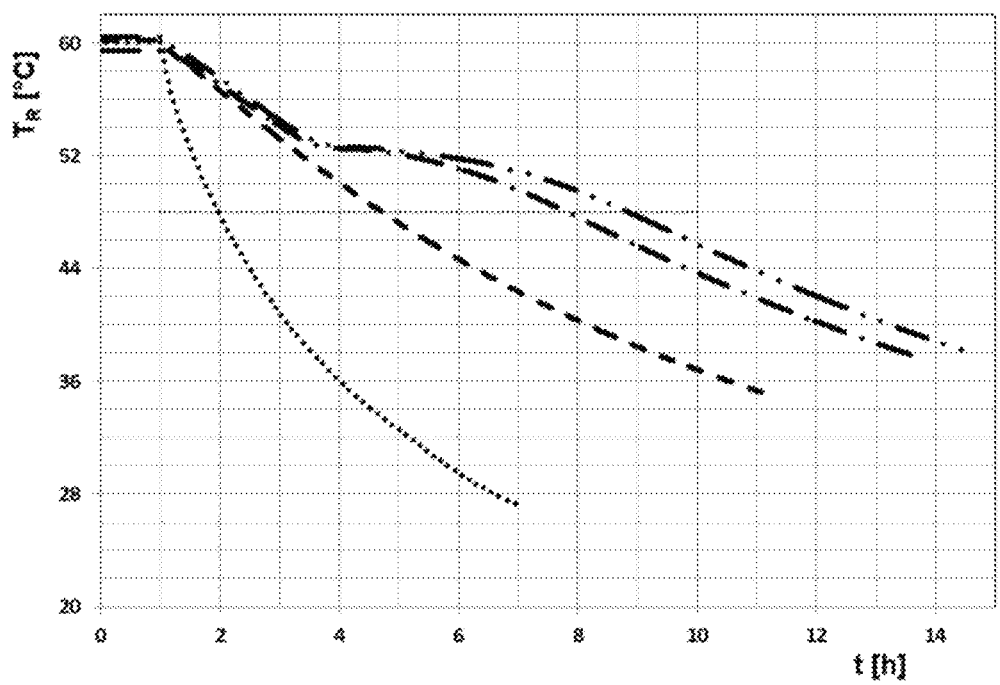
FIG. 4 shows, analogously to FIG. 3, the measured temperature profiles of water with a flow temperature of 60° C. after flow interruption in a stainless-steel pipe with an outer diameter of 54 mm and a wall thickness of 1.5 mm.

In a preferred embodiment b1) of the second step b) of the method according to the invention, the heat reservoir layer (1) is arranged around the pipe (4), for example in the form of a tape, and optionally fastened. In this case, the heat reservoir layer (1) can cover the pipe (4) completely or only partially. The heat reservoir layer (1) can be fastened in a spiral around the pipe (4) and/or—for example in the form of an elongate rectangle—can be attached completely around the pipe (4) (FIG. 4). The width of the rectangle may, for example, be chosen so that it corresponds to the circumference of the pipe (4) and thus, when placed around the pipe (4), completely surrounds it. It is also possible that the width of the rectangle is chosen to be smaller than the pipe circumference, so that a part of the pipe is not encased by the heat reservoir layer (1), and/or so that two or more rectangles of the heat reservoir layer (1) are placed on the pipe surface, for example parallel to each other. In addition, it is also possible that two or more heat reservoir layers (1) with the same or different composition can be superimposed. Subsequently, the pipe (4) covered with the heat reservoir layer (1) is encased by thermal insulation material (5), in particular by thermal insulation material (5) with a suitable profiling, i.e. recess, optimally surrounding the pipe (4) with heat reservoir layer (1), whereby an encased pipe (41) is obtained.

Figure 3:
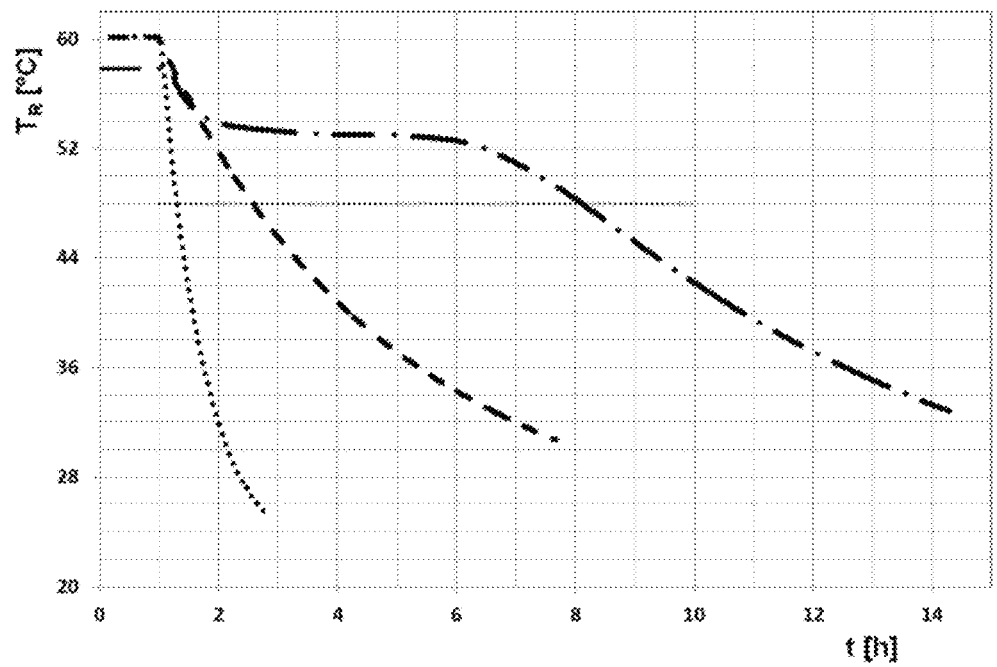
FIG. 3 shows, analogously to FIG. 2, the measured temperature profiles of water with a flow temperature of 60° C. after flow interruption in a stainless-steel pipe with an outer diameter of 22 mm and a wall thickness of 1.2 mm.

In another preferred embodiment b2) of the second step b) of the method according to the invention, the heat reservoir layer (1) is first brought into contact with the thermal insulation material (5), whereby a heat reservoir insulation composite (51) is obtained, with which subsequently the pipe (4) is encased such that the heat reservoir layer (1) of the heat reservoir insulation composite (51) comes to lie between the pipe (4) and the thermal insulation material (5) of the heat reservoir insulation composite (51). The heat reservoir layer (1) may surround all or just part of the inner layer of thermal insulation material (5) (FIG. 3). It is also possible to equip only a part, for example only one half, of a multi-part pipe shell with a heat reservoir layer (1). Here, the thermal insulation material (5) is preferably provided with a profiling, i.e. recess, wherein the heat reservoir layer (1) is arranged in this profiling. The profiling of the thermal insulation material (5) is typically chosen to optimally surround the pipe (4) and the heat reservoir layer (1).

The latent heat reservoir material (2) of the heat reservoir layer (1) is advantageously chosen so that the melting point, i.e. the solid-liquid phase-change or phase-transition temperature of the latent heat reservoir material (2) deviates somewhat, i.e. typically by 1° C. to 5° C., from the temperature of the fluid situated and conveyed in the pipe. If the medium temperature—typically with fluid media kept warm—is higher than the ambient temperature, then the melting point is advantageously lower than the temperature of the conveyed medium. And if the medium temperature—typically in the case of cooled fluid media—is lower than the ambient temperature, then the melting point of the latent heat reservoir material (2) is advantageously above the temperature of the conveyed medium.

In hot water conduits in larger buildings, the setpoint water temperature is for example 55° C. If the hot water flow is stopped, the hot water cools down only with thermal insulation and without a heat retention system. If now a latent heat reservoir material (2) with a melting point of 50 to 54° C.—for example diphenylamine having a melting point of 52.9° C. or a paraffin with 24 carbon atoms of 50.6° C.—used, the whole latent heat reservoir material (2) present in the heat reservoir layer (1) lies at a temperature higher than its melting point. Accordingly, the latent heat reservoir material (2) is in the molten, i.e. liquid, state of aggregation. If the hot water flow is now interrupted, the hot water will cool down a bit. However, as soon as the temperature of the hot water comes within the range of the melting temperature of the latent heat reservoir material (2), a portion of the latent heat reservoir material (2) solidifies, whereby enthalpy of fusion is released. This in turn is delivered to the surrounding environment and to the hot water. This prevents further cooling and stabilises the temperature of the hot water in the region of the melting temperature of the latent heat reservoir material (2). This process lasts until all the latent heat reservoir material (2) has solidified. The time duration for which the hot water should be held at the desired temperature can thus also be determined by the choice of the layer thickness of the heat reservoir layer (1), the type and amount of latent heat reservoir material (2) in the heat reservoir layer (1), and the type and thickness of the thermal insulation material (5). During the next hot water withdrawal, the warm water flowing through warms the solidified latent heat reservoir material (2), causing it to melt again and thus be activated for the next cycle.

In a refrigeration system in which a cooled fluid medium flows through the pipe (4), the ambient temperature is greater than the temperature of the fluid medium. If the latter has a temperature of for example −23° C., a latent heat reservoir material (2) for example with a melting point of −16° C. to −21° C. can be used. Non-limiting examples are ethylene glycol having a melting point of −16° C. or an aqueous calcium chloride, $CaCl_2$), solution of −21.3° C. Thus, in this arrangement, all latent heat reservoir material (2) is in solidified form. If now the flow of the fluid medium of the refrigeration system is stopped, the cooled medium heats up to the melting temperature of the latent heat reservoir material (2). If heat now continues to penetrate from the outside via the thermal insulation in the direction of the pipe (4), first the latent heat reservoir material (2) is melted. During this process, the cooled fluid continues to remain constantly cooled until all of the latent heat reservoir material (2) has melted. The time for which the cooled fluid medium should be kept at the desired temperature can thus be determined with a suitable choice of the layer thickness of the heat reservoir layer (1), the type and amount of the latent heat reservoir material (2) in the heat reservoir layer (1), and the type and thickness of the thermal insulation material (5). If the interruption is remedied, the flowing cold fluid medium cools the molten latent heat reservoir material (2), causing it to solidify again and thus be activated for a next interruption.

When transporting fluids in the boiling state and at temperatures below the ambient temperature, an interruption of the fluid transport leads to the evaporation of the liquid and thus to a rapid pressure increase and safety-critical conditions. With the method according to the invention, the pipe (41) encased in accordance with the invention, the heat reservoir insulation composite (51) according to the invention, and the passive heat/cold retention system for hot/cold water conduits, this effect is prevented for a longer time, during which the disturbance usually can be fixed. In most cases this can prevent the response of safety valves or rupture discs. This is particularly important for modern refrigerators with natural refrigerants, such as pentane, butane, propane, ammonia and/or $CO_2$, since the fluids are operated at temperatures close to their boiling point.

Low-temperature thermal networks are also increasingly being operated with $CO_2$, wherein with the present invention much more powerful and energy-efficient pipeline insulations can be installed between the heat source and the sink.

Those skilled in the art will be able to determine suitable latent heat reservoir materials (2), their proportion in the heat reservoir layer (1), the necessary layer thickness of the heat reservoir layer (1) and also the type and thickness of the optimal thermal insulation material (5) on the basis of known, publicly available data and, as appropriate, on the basis of his specialist knowledge.

The Heat Reservoir Layer (1)

The heat reservoir layer (1) is preferably in the form of a flat layer with typically uniform layer thickness. At temperatures above the melting point of the latent heat reservoir material (2), the heat reservoir layer (1) is typically flexible and thus bendable and mouldable.

The layer thickness of the heat reservoir layer (1) can be chosen substantially arbitrarily and adapted to the specific requirements. In many cases, however, a layer thickness of the heat reservoir layer (1) of about 0.1 to 20 cm, preferably from about 0.15 to 10 cm, in particular from about 0.2 to 5 cm, measured with a vernier caliper according to DIN 862, in particular with a vernier caliper according to DIN 862 of form 1A, is sufficient.

The heat reservoir layer (1) of the method according to the invention and of the heat reservoir insulation composite (51) according to the invention comprises at least one latent heat reservoir material (2) and at least one matrix material (3), wherein, if the latent heat reservoir material (2) is present in microencapsulated form, the matrix material (3) is not a thermal insulation material (5).

The latent heat reservoir material (2) is incorporated in the matrix material (3). Thus, the matrix material (3) allows the latent heat reservoir material (2) to remain in place and thus not flow away, even in the liquid state. This also prevents the latent heat reservoir material (2) from reaching the surface of the heat reservoir layer (1) as a liquid, i.e. the bleeding, also referred to as sweating, of the heat reservoir layer (1) is significantly reduced or even completely prevented.

In a preferred embodiment, the amount of latent heat reservoir material (2) in the heat reservoir layer (1) is selected such that the solid/liquid heat capacity (including the phase-change enthalpy) of the heat reservoir layer (1) within a temperature range of 10 K is at least 50 kJ, preferably at least 80 kJ, in particular at least 120 kJ, per kg heat reservoir layer (1) and is measured by DSC according to EN ISO 11357-1 and -4. Those skilled in the art will know how to determine this amount without exercising inventive skill. The amount of latent heat reservoir material (2) is particularly dependent on the desired melting temperature of the heat reservoir layer (1), the selected latent heat reservoir material (2) and the heat capacity of the fluid medium. The matrix material (3) used generally contributes little to the heat capacity of the heat reservoir layer (1).

In another preferred embodiment, the heat reservoir layer (1) consists substantially of 30 to 95 wt. %, preferably 40 to 90 wt. %, in particular 50 to 85 wt. %, latent heat reservoir material (2), 5 to 70 wt. %, preferably 10 to 60 wt. %, in particular 15 to 50 wt. %, matrix material (3), and 0 to 20 wt. %, preferably 0 to 15 wt. %, in particular 0 to 10 wt. %, other components.

A preferred further component of the heat reservoir layer (1) comprises at least one nucleation additive in an advantageous amount of 0.1 to 10 wt. %, preferably from 0.2 to 6 wt. %, in particular from 0.3 to 5 wt. %, based on the total amount of the used latent heat reservoir material (2). Suitable nucleation additives are known to those skilled in the art. Non-limiting examples include silicon dioxide, silica, nanoparticles, metal oxide particles of iron, copper and/or aluminium, and/or carbon nanotubes.

The Layer (11)

In another preferred embodiment, at least one side of the heat reservoir layer (1)—over the entire surface or only part of the surface—is covered by a layer (11), wherein the layer (11) is preferably a paper layer, a plastic film, in particular a polyethylene, PE, polypropylene, PP, polystyrene, PS, polyethylene terephthalate, PET and/or plastic laminate film, a metal foil, in particular an aluminium, copper, tin, zinc and/or steel foil, a metal-plastic layer, and/or a laminate. In this case, the layer (11) can also be reinforced by means of fibres, in particular glass fibres, carbon fibres and/or plastic fibres.

If the side of the heat reservoir layer (1) facing the fluid medium comprises a layer (11), it is preferably a heat-conducting layer (11). If the side of the heat reservoir layer (1) facing away from the fluid medium comprises a layer (11), this layer is preferably a non-heat-conducting layer (11). A thermally conductive layer (11) is understood to mean that the layer (11) has a thermal conductivity of $\geq 10$ W/(m·K). Preferred, non-limiting examples of suitable heat-conducting layers (11) are metal foils such as aluminium foil, copper foils, tin, zinc and/or steel foil. Preferred, non-limiting examples of suitable non-heat-conducting layers (11) are plastic films, such as PE films, PP films and/or PET films.

Advantageously, the layer (11) has a layer thickness of 0.001 mm to 2 cm, preferably from 0.002 mm to 1 cm, in particular from 0.003 mm to 0.5 cm, measured with a vernier caliper according to DIN 862, in particular with a vernier caliper according to DIN 862 of form 1A. If the layer thickness measurement with vernier caliper is not possible due to insufficient layer thickness, i.e. if the standard deviation of the mean value of 5 measurements is more than 30% of the mean value, the layer thickness is determined using an ultrasonic thickness gauge.

The Composite (13, 14, 15, 16)

In a particularly preferred embodiment, the heat reservoir layer (1) constitutes a composite, in particular a composite (13, 14, 15, 16), substantially, i.e. in particular to an extent of at least 80 wt. %, based on the heat reservoir layer (1).

In a preferred embodiment i), the heat reservoir layer (1) is substantially a composite (13), wherein the composite (13) is obtained by heating, mixing and cooling at least one latent heat reservoir material (2), at least one matrix material (3) and optionally at least one nucleation additive. Such composites (13) are known to those skilled in the art and are described in the literature, for example in WO-A-2009/118344. They can be produced, for example, by means of extrusion, subsequently granulated as appropriate, and further processed, for example, to give a flat heat reservoir layer (1) or to give fibres. The fibres can be used for example for the production of non-wovens and/or woven fabrics and can be used in this form as a composite (13) in the heat reservoir layer (1).

In a preferred embodiment ii), the heat reservoir layer (1) is substantially a composite (14), wherein the composite (14) comprises the latent heat reservoir material (2), which sorbs on the matrix material (3), i.e. is adsorbed and/or absorbed. In this case, the matrix material (3) is preferably a non-woven, a woven fabric and/or a flat porous material, wherein the non-woven and/or woven fabric may optionally comprise fibres produced from the composite (13). Also, the non-woven and/or woven fabric may comprise hollow fibres in which latent heat reservoir material (2) is disposed, i.e. for example filled, adsorbed and/or absorbed. Suitable non-wovens, woven fabrics and flat porous materials are known to those skilled in the art. A non-limiting example of a flat porous material is a thin porous metal layer, such as sintered metal.

In a preferred embodiment iii), the heat reservoir layer (1) substantially constitutes a composite (15), wherein the composite (15) comprises a powder and/or granular material (151), which is connected to at least one matrix material (3), in particular an adhesive, and optionally also to at least one layer (11). The powder and/or granular material (151) are/is preferably present in the form of microencapsulated latent heat reservoir material (2) and/or the latent heat reservoir material (2) is sorbed, i.e. adsorbed and/or absorbed, on porous powdered and/or granular carrier material. For the purposes of the invention, the carrier material and the capsule material are considered to be matrix material (3).

The production of microencapsulated latent heat reservoir materials (2) is known and commercially available.

Suitable porous powdered and/or granular carrier materials for the preparation of the powder and/or granular material (151) of the composite (15) are known to those skilled in the art. Also, the adsorption and absorption of latent heat reservoir materials (2) on powder and/or granular material (151) is known.

This is preferably carried out at temperatures above the melting point of the latent heat reservoir material (2) in question. The powder and/or granular material (151), together with the latent heat reservoir material (2) contained therein, can also be coated with a polymer film, for example, in order to additionally prevent latent heat reservoir material (2) from being desorbed in the liquid state.

A suitable and particularly preferred matrix material (3) for connecting together the powder and/or granular material (151) of the composite (15) is an adhesive with which the powder and/or granular material (151) are held together, i.e. fixed. For example, the powder and/or granular material (151) can be applied to a layer (11) and then adhesively bonded to the adhesive. Optionally, a further layer can be applied on top with the adhesive. The adhesive may be a one-, two- or multi-component adhesive and thus optionally a reactive adhesive. Suitable adhesives are known to the person skilled in the art.

In a preferred embodiment iv), the heat reservoir layer (1) basically represents a composite (16), wherein the composite (16) comprises the latent heat reservoir material (2) and a thickener, wherein the composite (16) is typically in the form of a highly viscous liquid, a gel, powder, granular material, flakes and/or paste. Particularly suitable latent heat reservoir materials (2) of the composite (16) include water and aqueous mixtures and/or aqueous solutions.

Some of the thickeners may additionally act as nucleating agents for the latent heat reservoir material (2). An example of this is $SiO_2$.

Suitable thickeners are thickeners which are adapted to the latent heat reservoir material (2) in question and comprise organic and inorganic thickeners.

Those skilled in the art will be aware of suitable thickeners and will also be able to make a suitable selection, optimally adapted to the latent heat reservoir material (2) in question.

In another particularly preferred embodiment v), the heat reservoir layer (1) comprises substantially, i.e. in particular to an extent of at least 80 wt. %, based on the heat reservoir layer (1), a plurality of, i.e. 2 or more, chambers formed of matrix material (3), wherein the chambers contain latent heat reservoir material (2), i.e. the chambers are preferably filled with the latent heat reservoir material (2). The latent heat reservoir material (2) is preferably in pure form, as a powder and/or granular material (151), as a composite (13, 14, 15, 16) and/or as mixtures of two or more composites (13, 14, 15, 16). The chambers can be open on one side, for example, so that they can be easily filled, wherein the chambers can be covered by a subsequently attached layer (11).

The Latent Heat Reservoir Material (2)

The latent heat reservoir material (2) of the heat reservoir layer (1) stores the phase transition enthalpy or releases this to the fluid medium. Thus, the latent heat reservoir materials (2) use the phase change from solid to liquid to absorb heat or use the phase change from liquid to solid to give off heat. The term "phase-transition enthalpy", also called "phase-change enthalpy", refers to the melt or the solidification enthalpy of the solid/liquid or liquid/solid phase transition.

In accordance with the invention "phase change" means the change of the state of matter from solid to liquid, i.e. melting, or from liquid to solid, i.e. solidification or freezing. According to the invention, melting, solidification and freezing are used as synonyms. All phase transitions typically have the same enthalpy, wherein the absolute value, i.e. the amount of the enthalpy value, is relevant. These are also used as synonyms.

Phase-change temperature is understood to be the melting point for the phase transition from solid to liquid and the solidification or freezing temperature for the phase transition from liquid to solid. These temperatures usually have the same value and are used as synonyms. If the latent heat reservoir material (2) has a phase-change temperature range, the phase-change temperature is understood to be the arithmetically averaged temperature of the temperature range. If this cannot be clearly determined, the phase-change temperature is understood as the temperature at which the enthalpy uptake of a DSC measurement reaches its maximum. In the context of the invention, therefore, the melting temperature range is to be understood as the melting temperature and the solidification temperature range is to be understood as the solidification temperature.

According to the invention, materials which have a solid-liquid phase-change enthalpy of at least 120 kJ/kg of latent heat reservoir material (2) within a phase-change temperature range of 5 K are known as latent heat reservoir materials (2), also phase-change materials, abbreviated to PCM. Phase-change enthalpies of suitable substances are known from the literature to those skilled in the art. In the absence of corresponding enthalpy values, the phase-change enthalpy can be measured by means of DSC according to EN ISO 11357-1 and -4.

In a preferred embodiment, the latent heat reservoir material (2) has a melting point between −182° C. and +175° C., preferably between −80° C. and +150° C., in particular between −25° C. and +125° C. Thus, for example, methane with a melting point of −182° C. can be used as latent heat reservoir material (2) to cool oxygen, which has a boiling point of −182° C. at normal pressure, and to protect against evaporation in the event of failure of the cooling system. This is because if the oxygen has a slightly higher pressure, the boiling point also increases accordingly, for example, to −180° C. If methane is used as the latent heat reservoir material (2), it is advantageous if the methane is adsorbed, for example on a carrier material at room temperature, and optionally encapsulated in order to prevent the evaporation of the methane. Also, a pipe (4) may comprise a steam conduit in which steam is conveyed with, for example, a temperature of 125° C. For this purpose, a latent heat reservoir material (2) is advantageously used, which has a phase-change temperature of 120° C. to 123° C. A non-limiting example of a suitable latent heat reservoir material (2) is benzoic acid with a melting point of 121.7° C.

In another preferred embodiment, the latent heat reservoir material (2) comprises at least one organic compound, in particular a hydrocarbon, paraffin, alcohol, glycol, polyol, sugar, ketone, ester, ether, carboxylic acid, fatty acid, amide, a sulphur, phosphorus and/or or nitrogen compound, and/or an inorganic compound, in particular an inorganic salt, salt hydrate, water and/or an aqueous mixture. Those skilled in the art will be aware of suitable latent heat reservoir materials (2), these being described many times in the literature, for example in the VDI Wärmeatlas, 10th Edition, Springer Verlag.

Preferred, non-limiting examples include $C_{14}$ to $C_{34}$ paraffins with melting points between 5.5 and 75.9° C. and an enthalpy of fusion of about 200 to 269 kJ/kg, such as hexadecane with a melting point of 18.3° C. and an enthalpy of fusion of 210 kJ/kg, ethylene glycol, which has a melting point of −12.9° C. and an enthalpy of fusion of 160 kJ/kg, water with a melting point of 0° C. and an enthalpy of fusion of 333.6 kJ/kg, aqueous mixtures such as a glycol-water mixture, with which at optimum mixing ratio, i.e. approximately 70 wt. % glycol and 30 wt. % water, a freezing point of −56° C. and an enthalpy of fusion of 212 kJ/kg can be obtained, or water-salt mixtures, wherein the salt may be sodium chloride, calcium chloride and/or potassium chloride, metal salts such as sodium silicate pentahydrate, $Na_2SiO_3 \cdot 5H_2O$ with a melting point of 72.2° C. and an enthalpy of fusion of 267 kJ/kg, and myristic acid with a melting point of 54° C. and an enthalpy of fusion of 199 kJ/kg.

The Matrix Material (3)

The matrix material (3) of the heat reservoir layer (1) forms a matrix, i.e. a structure which prevents the latent heat reservoir material (2) from flowing away in the liquid, i.e. molten form—and also optionally in powder and/or granular form. Therefore, it is generally advantageous if the matrix material (3) at room temperature and typically also up to at least 10° C., preferably up to at least 25° C., in particular up to at least 50° C., above the phase transition temperature of the latent heat reservoir material (2) incorporated therein is in substantially solid form.

In a preferred embodiment, the matrix material (3) is a synthetic and/or natural polymer, in particular a polymer based on olefinic monomers such as acrylates, styrene and/or olefins such as polymethyl acrylate, styrene (co)polymers, polyethylene and/or polypropylene, a block copolymer such as block copolymers comprising styrene and/or ethylene, a condensation polymer, in particular polyester, polyamide and/or polyethylene terephthalate, a biopolymer, in particular a protein, a polysaccharide, and/or a natural fibre, a carrier material, a thickener and/or an adhesive. Accordingly, the matrix material (3)—at the time it is mixed with the latent heat reservoir material (2)—is a fully reacted polymer, and thus typically chemically inert to the exposed environment.

According to the particularly preferred embodiments i), ii), iii) iv) and v) and the composites (13, 14, 15, 16), a matrix material (3) or a multiplicity of different matrix materials (3) can be used.

Preferably suitable matrix materials (3) for embodiments i) and ii) include acrylates and methacrylates, such as polymethyl methacrylate, PMMA, polyethylene, LDPE, HDPE, polypropylene, polyethylene terephthalate, polystyrene, block polymers such as styrene-butadiene block copolymer, styrene-polybutadiene block copolymer, styrene-isoprene block copolymer, styrene-polyisoprene block copolymer, styrene-ethene-butene-styrene block copolymer (SEBS), styrene-[ethylene(ethylene-propylene)]-styrene block copolymer (SEEPS), polyamides, polyesters, cellulose, silicates, glass fibres, woven fabrics such as glass woven fabrics and/or non-wovens.

Preferably suited matrix materials (3) for embodiments iii) include carrier materials and adhesives. Non-limiting examples of suitable carrier materials include expanded clay, expanded glass, aerosil, silica, expanded vermiculite, amorphous silicon dioxide, pumice, expandable shale, perlite, fly ash and/or organic powders and/or granular material, such as porous polysaccharides such as starch ethers and/or cellulose fibres. Non-limiting examples of suitable adhesives include organic adhesives such as water-based adhesives, for example dispersion adhesives based on vinyl acetate or ethylene-vinyl acetate, polyacrylate adhesives, polyurethane adhesives, epoxy hardener adhesives, hot melt adhesives, particularly reactive hot melt adhesives, and/or inorganic adhesives such as water glass, gypsum and/or cement.

It is noted that porous materials can be used both as thermal insulation material (5) and as carrier material for example for producing a composite (15) of embodiment iii) or as a thickener for producing a composite (15) of embodiment iv). These materials such as expanded clay, Aerosil and/or amorphous silicon dioxide are suitable as thermal insulation materials (5), provided that their pores are filled with gas, in particular with air. However, if a liquid or a solid fills these pores, they lose the thermal insulation properties. However, they then develop their effect as a carrier material or as a thickener.

Preferably suited matrix materials (3) for embodiment iv) include organic and inorganic thickeners. Non-limiting examples of suitable thickeners—especially for water and aqueous systems—are acrylate thickeners, crosslinked polyacrylic acids, associative thickeners, polysaccharide thickeners, for example starch ethers, cellulose ethers, guar ethers, carrageenan, locust bean gum, pectins, xanthan, polyvinyl alcohol, polyvinyl acetate, silicates, silicon dioxide, $SiO_2$, aerogels, silica gels, aerosils, bentonites, hectorites and/or carbon nanotubes. For organic latent heat reservoir materials (2) it is also possible to use hydrophobically modified thickeners, such as hydrophobic organic polymers and/or hydrophobic $SiO_2$.

Suitable matrix materials (3) for the chambers of embodiment v) include polymethyl methacrylate, PMMA, polyethylene, LDPE, HDPE, polypropylene, polyethylene terephthalate, polystyrene, block polymers such as styrene-butadiene block copolymer, styrene-polybutadiene block copolymer, styrene-isoprene block copolymer, styrene-polyisoprene block copolymer, styrene-ethene-butene-styrene block copolymer (SEBS) and/or styrene-[ethylene(ethylene-propylene)]-styrene block copolymer (SEEPS).

The Pipe (4)

The pipe (4) of the method according to the invention is typically a commercially available pipe that can also be used in conventional methods. The term "pipe (4)" according to the invention also includes tubes, i.e. flexible and bendable pipes, for example a plastic tube. The pipe (4) may have a smooth or undulating or otherwise profiled surface. Thus, corrugated tubing made of plastic and/or metal is included.

The diameter of the pipe (4) depends on the field of use and the amount of conveyed fluid medium. For smaller refrigerators, it may be a thin pipe with a diameter of, for example, 1 cm or less. The term "pipe (4)" is also understood to mean pipelines or conduits, provided they are suitable for conveying fluid media in the sense of the invention.

The pipe (4) is preferably a pipe made of substantially one type of material and thus typically a one-layer pipe. Accordingly, the pipe (4) preferably does not consist of a plurality of different layers of different materials, as disclosed, for example, in WO-A-2011/161472 or WO-A-2012/175994.

In the sense of the invention, the pipe (4) does not include pipelines or pipes for the petroleum or natural gas industry.

In a preferred embodiment, the pipe (4) is a glass pipe, a metal pipe, in particular a brass pipe, steel pipe, stainless steel pipe, aluminium pipe, and/or copper pipe, and/or a plastic pipe, in particular a pipe made of PVC, PET, acrylic glass, polyurethane, polycarbonate, polybutadiene, polypropylene, polyethylene and/or composite materials.

Suitable pipes (4) for hot water in building technology, for example for multi-storey multi-family houses, typically have an inner diameter of about 0.5 cm to about 50 cm, in particular from about 1 cm to about 35 cm. The inner diameters are preferably measured with a vernier caliper according to DIN 862, in particular with a vernier caliper according to DIN 862 of form 1A.

The pipe (4) may have any cross-section. In many cases, the preferred cross-section is a round cross-section. However, it can also be oval, ellipsoidal, angular, for example quadrangular and/or angular. If, for example, the pipe is arranged spirally, the entire spiral can also be encased as if the total diameter of the spiral were the diameter of the pipe (4). It is also possible—and often preferred—if the fluid media flowing in the pipe (4) are under pressure, i.e. have a pressure of greater than 1 bar, for example water in water conduits such as hot water, gases in cooling units, or steam in steam pipes.

If the pipe (4) according to method step b1) is first encased by the heat reservoir layer (1) and then by thermal insulation material (5) or according to process step b2) is encased directly by the heat reservoir insulation composite (51), the encased pipe (41) obtainable by the method according to the invention is produced.

The Thermal Insulation Material (5)

The thermal insulation material (5) is used for thermal insulation of both the heat reservoir layer (1) and the pipe (4) and the fluid medium therein. Thus, the temperature compensation is slowed down significantly with the ambient temperature. However, the thermal insulation is unsuitable for the purpose of heat storage, since the heat capacity of the thermal insulation materials (5) is usually too low.

Preferred thermal insulation materials (5) have a thermal conductivity of $\leq 0.1$ W/(m·K), preferably $\leq 0.07$ W/(m·K), in particular $\leq 0.04$ W/(m·K).

The optimum layer thickness of the thermal insulation material (5) depends on the specific application and the individual needs, and those skilled in the art can easily make the appropriate choice.

Often it is helpful if the thermal insulation material (5) completely surrounds the pipe (4) and the heat reservoir layer (1). In addition, it is advantageous if an embodiment which is as user-friendly as possible is selected, for example in the form of a heat reservoir insulation composite (51) and/or in the form of what is known as a reservoir shell, which is manufactured at the factory and can be easily arranged around the pipe (4) on-site, as shown in FIG. 3.

Suitable thermal insulation materials (5) are known to those skilled in the art. Preferred non-limiting thermal insulation materials (5) include expanded polystyrene (EPS), extruded polystyrene (XPS), polyurethane (PUR), polyisocyanurate (PIR), phenol resin (PF), flexible elastomer foam (FEF), polyethylene foam (PEF), urea formaldehyde resin foam (UF), rigid PVC foam, polyurethane spray insulation, rubber such as natural rubber, or synthetic rubber such as styrene-butadiene rubber (SBR) or ethylene-propylene-diene rubber (EPDM), mineral fibre, mineral foam, mineral wool (MW), rock wool, glass wool, foam glass (CG), expanded clay, perlite and expanded perlite (EPB), vermiculite and expanded vermiculite, aerated concrete, wood fibre insulation board (WF), wood wool insulation board (WW), cellulose insulation (CI), cork, ground cork, cork board and cork insulation board (ICB), microporous insulation material, aerogel, vacuum insulation panel (VIP), vacuum insulation and/or insulation materials of animal and/or plant origin, such as insulation boards of sheep wool, reed boards, coconut fibre matting and/or flat fibre boards, wherein in particular EPS, PU, PIR, elastomer, rubber, styrene-butadiene rubber (SBR), ethylene-propylene-diene rubber (EPDM), FEF, stone, glass wool, glass foam and/or mineral foam are preferred.

In one embodiment, in particular foamed thermal insulation materials (5) are preferred, with expanded or extruded organic polymers being very particularly preferred.

The thermal insulation material (5) and the heat reservoir insulation composite (51) can also have a vapour barrier in the cladding, i.e. in the outer layer.

The layer thickness of the thermal insulation material (5) can be selected substantially arbitrary and adapted to the specific requirements. In many cases, layer thickness of the thermal insulation material (5) of about 0.2 to 40 cm, preferably from about 0.5 to 20 cm, in particular from about 0.5 to 10 cm, measured with a vernier caliper according to DIN 862 are suitable.

The Heat Reservoir Insulation Composite (51)

The heat reservoir insulation composite (51) according to the invention is obtained in that the heat reservoir layer (1) is brought into contact with, i.e. connected to, the thermal insulation material (5). It is particularly suitable for building and home technology. The heat reservoir insulation composite (51), however, due to dimensions that allow the encasement of pipes (4) with certain diameters, can also be used for chemical and process facilities, in particular in the field of specialty chemicals.

In a preferred embodiment the thermal insulation material (5) has a profiling, i.e. recess, due to which the thermal insulation material (5) can be placed around the pipe (4) in a simple manner. If this recess enlarges somewhat, i.e. substantially by the layer thickness of the heat reservoir layer (1), the heat reservoir layer (1) can be inserted into this recess and advantageously fastened, i.e. clamped, screwed, nailed, fixed, and/or glued, whereby the heat reservoir insulation composite (51) according to the invention is obtained. Thus, the heat reservoir insulation composite (51) is present in the form of a closable pipe shell, which may optionally be surrounded by a film, in particular a fibre-reinforced protective film.

The heat reservoir insulation composite (51), in particular if it is in the form of a pipe shell, is advantageously produced at the factory. Thus, the pipe (4) can be encased on-site, for example at the construction site, so that the heat reservoir layer (1) of the heat reservoir insulation composite (51) comes to lie between the pipe (4) and the thermal insulation material (5) of the heat reservoir insulation composite (51). Accordingly, the heat reservoir insulation composite (51) according to the invention is also very well suited for retrofitting existing, permanently installed pipes (4) and conduits.

The Passive Heat/Cold Retention System for Hot/Cold Water Conduits

The passive heat retention system according to the invention for hot water conduits and/or cold retention system according to the invention for cold water conduits, i.e. for the heat/cold retention system for hot/cold water conduits, comprise/comprises at least one pipe (41) encased in accordance with the invention and/or a pipe (4) encased by the heat reservoir/insulation composite (51) according to the invention. It is particularly suitable for pipes for building and home technology, building construction as well as for chemical and process facilities.

In a preferred embodiment the passive heat retention system has no circulation system with circulation pump and thus also no return lines.

In another preferred embodiment, in the passive heat/cold retention system, no external energy needs to be fed and/or removed in order to function. In other words: The energy contained in the hot water is sufficient to supply the necessary enthalpy of fusion to the latent heat reservoir material (2) in order to heat same and melt it, and thus to "activate" it. In the event an interruption to the flow of hot water, the energy stored in the latent heat reservoir material (2) is released over a longer period of time to the water, whereby the water in the pipe remains above a defined limit for hours, for example over 7 hours or more. There is no need to add additional energy when the flow is interrupted. Also, no circulation system is necessary to keep the hot water warm enough. The cold water also can quickly and easily dissipate the energy stored in the latent heat reservoir material (2), i.e. the enthalpy of fusion, thus "activate" it. In the event of an interruption to the flow of cold water, the enthalpy of fusion must first be reintroduced by means of the heat input from outside, as a result of which the latent heat reservoir material (2) begins to melt. This process takes hours if properly dimensioned, during which time the water remains cooled. Again, no energy needs to be added to cool the water when the flow is interrupted.

In a preferred embodiment of the passive heat retention system for hot water conduits, a latent heat reservoir material (2) having a phase-change temperature of preferably about 40° C. to 70° C., in particular from about 50° C. to 60° C., is used. A suitable non-limiting latent heat reservoir material (2) comprises myristic acid having a melting point of 54° C. and an enthalpy of fusion of 199 kJ/kg.

In a preferred embodiment of the passive cold retention system for cold water conduits, a latent heat reservoir material (2) having a phase-change temperature of preferably about −10° C. to 20° C., in particular from about −2° C. to 18° C., is used. Suitable non-limiting latent heat reservoir materials (2) include hexadecane having a melting point of 18° C. and an enthalpy of fusion of 210 kJ/kg and tetradecane having a melting point of 6° C. and an enthalpy of fusion of 225 kJ/kg.

Any mentioned matrix material (3) is suitable for the matrix materials (3) for producing the heat reservoir layer (1).

The above-mentioned thermal insulation materials (5) are suitable as thermal insulation material (5)—for the production of a suitable heat reservoir insulation composite (51) and/or for encasement of the pipe (4) covered by a heat reservoir layer (1)—wherein foamed thermal insulation materials (5) are particularly preferred, and expanded or extruded organic polymers are very particularly preferred.

In a preferred embodiment of the passive heat/cold retention system for hot/cold water conduits, in the case of the pipe (41) encased in accordance with the invention and/or the heat reservoir insulation composite (51) according to the invention, the ratio of the layer thickness of the thermal insulation material (5) to the layer thickness of the heat reservoir layer (1) is preferably from about 40:1 to about 0.5:1, preferably from about 20:1 to about 1:1, in particular from about 10:1 to about 2:1. Thus, a suitable embodiment of the pipe (41) or the composite (51), for example, a heat reservoir layer (1) comprising the latent heat reservoir material (2), has a layer thickness of 10 mm and the thermal insulation material (5) has a layer thickness of 30 mm. In another exemplary embodiment, the heat reservoir layer (1) has a layer thickness of 5 mm and the thermal insulation material (5) has a layer thickness of 50 mm.

Example 1: Preparation of a Heat Reservoir Layer (1)

The matrix material (3) used was formed from 100 g of granular polymethyl methacrylate (PMMA) and 150 g of granular styrene-ethene-butene-styrene block copolymer (SEBS, manufacturer Kraton Polymers Inc.) mixed together and pre-mixed at 250° C. for 2 minutes in the first zone, i.e. the feed zone, of a commercial twin-screw extruder.

As latent heat reservoir material (2), 740 g of paraffin with a melting point of 31° C. (RT31 from Rubitherm) and 1 g of hydrophobic, fumed silica $SiO_2$ (silicon dioxide, Evonik) as nucleating agent and thickener were mixed and dispersed at 50° C. in a 2.5 lt vessel with a commercial dispersing device (rotor-stator-rod homogeniser from IKA) for 5 minutes at a shear rate of 20,000 $s^{-1}$. They were then added to the extruder in the second zone and mixed with the polymers of the matrix material (3) for 3 minutes at 250° C. PCM. The extrudate was then cooled in a water bath and granulated to an average particle size of 3 mm, measured by sieve.

A larger amount of the granular material was introduced in a ZSK-MC-18 extruder from Coperion at T=250° C. with a residence time of 2 min and was drawn to form a flat heat reservoir layer (1) with a layer thickness of 5 mm and a width of 0.5 m. For better handling, both sides were then laminated with an aluminium foil and the heat reservoir layer (1) was cut to size.

The heat reservoir layer (1) thus obtained is relatively inflexible, for example at temperatures of 20° C., that is to say well below the melting point of the paraffin used. i.e. with a little pressure it can be plastically deformed easily. However, if the heat reservoir layer (1)—and thus all paraffin, i.e. the whole amount of latent heat reservoir material (2)—is heated for example to 40° C., i.e. well above the melting point of the paraffin used, the granular material and the heat reservoir layer made therefrom (1) is elastically deformable. At the cut edges, the paraffin can be felt, but no paraffin penetrates to the outside, also with pressure on the granular material or the heat reservoir layer (1) with molten paraffin at 40° C. Thus, neither the granular material nor the heat reservoir layer (1) bleeds, even with molten paraffin and under the application of pressure. The resultant heat reservoir layer (1) comprising 74 wt. % latent heat reservoir material (2) has a heat capacity, measured by DSC according to EN ISO 11357, of 140 kJ/kg heat reservoir layer (1).

Example 2: Production of the Coated Pipe (41)

The flat heat reservoir layer (1) produced in Example 1 with a layer thickness of 5 mm, a width of 0.5 m and aluminium lamination on both sides was cut into strips with a width of 2 cm. A stainless-steel pipe with an outer diameter of 5.4 cm was encased at an angle of approximately 45° by a heat reservoir layer strip. At the strip ends, the encasement was continued with another strip. In this case, either the ends of the strips were glued to the pipe and/or wrapped by adhesive tape to fix the heat reservoir layer strips on the pipe.

In a subsequent step, the pipe (4) thus covered with the heat reservoir layer (1) was coated with thermal insulation material (5) in the form of a pipe shell, the pipe shell being in the form of a polyisocyanurate foam (PIR foam). The pipe shell had an inner diameter of 6.4 cm, a layer thickness of 5 cm and a thermal conductivity of 0.027 W/(m·K). At the opening of the pipe shell arranged in the longitudinal direction, the pipe shell advantageously had a self-adhesive layer with which the pipe shell was subsequently closed. The structure of such an encased pipe (41), which was enclosed with a pipe shell made of thermal insulation (5), is shown by way of example in FIG. 7.

Example 3: Production of the Encased Pipe (41)

Example 2 was repeated, wherein a pipe in the form of a commercial rubber tube with an outer diameter of 5 cm was used as pipe (4). In addition, a pipe shell in the form of a flexible PU foam with a layer thickness of 5 cm was used as thermal insulation material (5).

The encased pipe (41) thus obtained, i.e. the rubber pipe coated in this way, had a comparatively high degree of flexibility, as compared to without the heat reservoir layer (1), even at temperatures well below the melting temperature of the latent heat accumulator (2) present in the heat reservoir layer (1).

Example 4: Production of the Heat Reservoir Insulation Composite (51) and Encasement of the Pipe (4)

Example 2 was repeated, using as latent heat reservoir material (2) the same amount of myristic acid having a measured melting point of about 53° C. and enthalpy of fusion of 199 kJ/kg, instead of the paraffin. The flat heat reservoir layer (1) thus produced with a layer thickness of 10 mm, a width of 0.5 m and aluminium lamination on both sides was cut into strips, the width being selected so that the thermal insulation material (5) to be lined could be lined on the inside over its entire surface. As thermal insulation material (5) around the pipe with outer diameter 2.2 cm, a hinged, two-piece PIR foam pipe shell with a layer thickness of 5 cm and an outer diameter of 14.2 cm was used (see FIG. 3, left half). A stainless steel pipe with a wall thickness of 1.2 mm and an outer diameter of 2.2 cm was sheathed by the resulting heat reservoir insulation composite (51).

Example 5: Determination of the Temperature Behaviour of the Passive Heat/Cold Retention System with Hot/Cold Water Conduits in the Event of Flow Interruption In a climate chamber with constant room temperatures, a test arrangement was set up in order to determine the temperature behaviour of the passive heat/cold retention system with hot/cold water conduits in the event that the flow is interrupted. For the tests with water temperature of 60° C., a room climate of 21° C. (heated room in winter) was set, and for the experiments with water temperature of 12° C., a room climate of 26° C. (summer temperature) was set.

The test set-up comprised a test and measuring section of 3 m in length from a linear, horizontally arranged stainless steel pipe, the ends of which were connected to a thermostat. The fluid temperature was precisely adjusted and maintained by means of the thermostat, using drinking water as the fluid. The required connecting lines from the thermostat to the pipe and back were minimised and optimally insulated with thermal insulation material.

For the tests with hot water, i.e. with a water temperature of 60° C., both a pipe with an outer diameter of 22 mm and a wall thickness of 1.2 mm, as well as a pipe with an outer diameter of 54 mm and a wall thickness of 1.5 mm was used. For the tests with cold water, i.e. with a water temperature of 12 to 13° C., a pipe with an outer diameter of 22 mm and a wall thickness of 1.2 mm was used. The stainless-steel pipes were—in accordance with Example 4—encased by a different heat reservoir insulation composite (51). The thermal insulation material (5) of the heat reservoir insulation composite (51) was a swissporKISODUR PIR shell with a thermal conductivity of 0.027 W/(m·K), a specific heat capacity of 1.4 kJ/(kg·K) and a bulk density of 32 kg/m$^3$. The particular composition can be found in the footnotes to Table 1. In addition, comparative tests were carried out with standard thermal insulation as well as completely without thermal insulation.

Four temperature sensors were installed at regular intervals along the test run in the interior of the stainless-steel pipe to determine the water temperature in the pipe, wherein, subsequently, only the average temperature of the two middle temperature sensors is indicated.

The test arrangement was circulated before each test for a sufficient time to ensure that the whole latent heat reservoir material (2) was in the liquid (for hot water) or in the solid (for cold water) state.

Table 1: Determination of the temperature behaviour of pipes with use of the passive heat or cold retention system according to the invention with hot or cold water conduits in the event of flow interruption point of 53° C. is now arranged between the pipe and the thermal insulation, the time until the limit of 48° C. is reached increases, again significantly. Thus, for the thinner pipe (test series A), a layer thickness of the heat reservoir layer (1) of 10 mm is sufficient to increase the time span from 1.5 hours to 7 hours. For the thicker pipe, a heat reservoir layer (1) just 5 mm thick extends the time from 3.7 hours to 6¾ h hours. A heat reservoir layer (1) 25% thicker increases the time until 48° C. is reached by another 2 hours (with slightly lower layer thickness of the thermal insulation).

Test series C shows the heating of cold water with a temperature of 12 to 13° C. with interruption of the water flow in a stainless-steel pipe with a diameter of 22 cm. Without thermal insulation, the limit of 20° C. is reached within just 55 minutes. If the pipe is covered with thermal insulation 30 mm thick made of commercially available PIR foam, the time until the water temperature in the pipe reaches the limit of 20° C. increases to 3.2 hours. If now a thin layer of only 5 mm of a heat reservoir layer (1) comprising 75% of a suitable latent heat reservoir material (2) with a melting point of 17° C. is arranged between the pipe and the thermal insulation, the time until the limit of 20° C. is reached increases to as much as 10.5 hours.

The tests clearly show that even with a thin layer of a heat reservoir layer (1) with a suitable latent heat reservoir material (2) between the pipe (4) and the thermal insulation

TABLE 1

Determination of the temperature behaviour of pipes with use of the passive heat or cold retention system according to the invention with hot or cold water conduits in the event of flow interruption

| Test Series | Pipe outer diameter [mm] | With heat reservoir layer (1) | Layer thickness heat reservoir layer (1) [mm] | thermal insulation | Layer thickness of thermal insulation (5) [mm] | Time until limit is reached?[8] |
|---|---|---|---|---|---|---|
| A (FIG. 3.)[1] | 22[3] | Yes[5] | 10 | Yes[7] | 50 | 7 h |
| keep warm | 22[3] | No | N/A | Yes[7] | 50 | 1.5 h |
|  | 22[3] | No | N/A | No | N/A | 20 min |
| B (FIG. 4)[1] | 54[4] | Yes[5] | 6.25 | Yes[7] | 48.75 | 8.75 h |
| keep warm | 54[4] | Yes[5] | 5 | Yes[7] | 50 | 6.75 h |
|  | 54[4] | No | N/A | Yes[7] | 50 | 3.7 h |
|  | 54[4] | No | N/A | No | N/A | 1 h |
| C (FIG. 5)[1] | 22[3] | Yes[6] | 5.0 | Yes[7] | 30 | 10.5 h |
| keep cool | 22[3] | No | N/A | Yes[7] | 30 | 3.2 h |
|  | 22[3] | No | N/A | No | N/A | 55 min |

[1] Ambient temperature 21° C.; Water temperature thermostat 60° C.
2. Ambient temperature 26° C.; Water temperature thermostat 12° C.
[3] Wall thickness of the pipe = 1.2 mm
[4] Wall thickness of the pipe = 1.5 mm
[5] The heat reservoir layer (1), analogously to Example 1, consists of 75 wt. % myristic with a measured melting point of about 53° C. as latent heat reservoir material (2) and 25 wt. % of a blend of PMMA/SEBS polymers as carrier material.
[6] The heat reservoir layer (1), analogously to Example 1, consists of 75 wt. % hexadecane with a measured melting point of 17° C. as latent heat reservoir material (2) and 25 wt. % of a blend of PMMA/SEBS polymers as carrier material.
[7] As thermal insulation, a commercially available PIR foam in the form of a two-part pipe shell with a thermal conductivity of 0.027 W/(m · K) was used.
[8] In test series A and B the set limit was 48° C. and in experiment C it was 20° C.

The test series and B show the cooling of hot water with a temperature of 60° C. with flow interruption of the water in a stainless-steel pipe with diameter of 22 mm (test series A) or 54 mm (test series B). Without thermal insulation, the water cools down within a short time. The cooling of the hot water in the thicker pipe is somewhat slower (1 hour) due to the larger mass than in the thinner pipe (20 minutes). Now, if the pipe is covered with a commercial PIR foam with a layer thickness of 50 mm, the time until the limit of 48° C. is reached is extended, for example by a factor of 4. If now a thin layer of a heat reservoir layer (1) comprising 75% of a suitable latent heat reservoir material (2) with a melting (5), a very significant increase in the cooling of hot water or the heating of cold water in hot/cold water conduits can be achieved. It does not matter whether the encased pipe (41) according to the invention is obtained by covering a pipe (4) first with the heat reservoir layer (1) and subsequently with thermal insulation (5), or if the pipe (4) is encased by a heat reservoir composite (51) according to the invention. The resulting passive heat/cold retention system with hot/cold water conduits works without energy input and allows countless warm-up/cool-down cycles without wear. It is also easy and inexpensive to produce and is maintenance-free.

The present invention will be explained in greater detail hereinafter with reference to the following drawings, and non-limiting, preferred embodiments of the method according to the invention, the encased pipe (41) obtained in accordance with the invention, and the heat reservoir insulation composite (51) will be shown. These are not to be construed in a limiting manner and are to be understood as part of the description:

FIG. 1 shows, by way of example, the logarithmically decreasing temperature profile of a warm, fluid medium along the radius of a pipe (4) with thermal insulation material (5) from inside the pipe (4) to the pipe wall (marked $d_1$) and further through the thermal insulation material (5) to the outside. The dotted line ( . . . ) shows schematically the temperature course within the thermal insulation material (5), wherein between the pipe (4) and the thermal insulation material (5) there is no latent heat reservoir material (2) present. Also, the thermal insulation material (5) itself contains no latent heat reservoir material (2). Thus, the dotted line represents a conventional embodiment of the prior art. The dashed line ( - - - ) shows schematically the temperature profile within the thermal insulation, wherein conventional microencapsulated latent heat reservoir material (2) is incorporated in the thermal insulation. What is shown is the temperature profile while the latent reservoir material is not yet completely solidified, that is to say relatively shortly after switching off the flow through the pipe, corresponding to shortly after the start of keeping the fluid medium warm. Such thermal insulation materials are known in the literature. Even if microencapsulated latent heat reservoir material (2) is distributed within the entire thermal insulation, only that part of the latent heat reservoir material (2) that is also in liquid form can serve as a heat reservoir, i.e. the temperature within this region of the thermal insulation must be at least equal to the melting temperature. The area within the thermal insulation which has such high temperatures, however, is usually very low (marked $d_2$), in particular because the latent heat reservoir material (2) is chosen so that its melting point is only slightly below the temperature of the conveyed fluid medium. Consequently, the proportion of thermal insulation which can function as a heat reservoir is very low. On the other hand, the thermal insulation with microencapsulated latent heat reservoir material (2) has an increased thermal conductivity, which limits the effect of the thermal insulation. As a result, both effects, i.e. maintenance of the temperature and lower thermal insulation, can cancel one another out due to increased thermal conductivity. The dash-dot line ( - - - ) shows schematically the temperature profile according to the present invention. The temperature within the pipe (4) to the pipe wall (marked with $d_1$) also corresponds to the temperature within the heat reservoir layer (1) (marked from $d_1$ to $d_3$). Only then does it decrease within the thermal insulation material (5) (from $d_3$) to the outside.

FIG. 2 shows, analogously to FIG. 1, the exponentially decreasing temperature profile $T_R$ in the case of flow interruption within the pipe (4). The dotted line ( . . . ) shows the temperature profile only with thermal insulation material (5) according to the prior art. The dashed line ( - - - ) shows the temperature profile with thermal insulation containing microencapsulated latent heat reservoir material (2) according to the prior art, and the dash-dot line ( - - - ) shows the temperature profile of the pipe (4) encased according to the present invention.

The temperature within the pipe (4) until time $t_1$ corresponds to the temperature of the fluid medium during the flow, i.e. the temperature corresponds to the desired temperature. If the delivery of the fluid medium is stopped now at the time $t_1$, and the pipe (4) is protected from cooling only by the thermal insulation material (5), the temperature of the fluid medium within the pipe (4) drops relatively quickly (dotted line . . . ).

If the thermal insulation contains microencapsulated latent heat reservoir material (2) according to the prior art (dashed line - - - ), the temperature initially decreases only slightly, but cannot be maintained. However, as soon as that portion of the microencapsulated latent heat reservoir material (2) that is in the immediate vicinity of the pipe (4) and thus in a molten state, i.e. at time $t_2$ has released its phase transition enthalpy, the temperature decreases and the fluid medium cools down.

With the heat reservoir layer (1) according to the invention, the temperature of the encased pipe (41)—and in particular in combination with the thermal insulation material (5), the pipe (4) encased by the heat reservoir insulation composite (51)—is maintained over a longer period of time (dash-dot line - - - ), even in the event that the fluid medium flow is interrupted (time $t_1$), until all the latent heat reservoir material (2) has released the phase transition enthalpy via the thermal insulation material (5) to the surrounding environment. Only then, i.e. at time $t_3$, does the fluid medium cool down. In practice, however, and with optimised layer thicknesses, this is only the case with untypically long interruptions, for example during longer maintenance works.

FIG. 3 shows, analogously to FIG. 2, the measured temperature profiles of water with a flow temperature of 60° C. after flow interruption in a stainless-steel pipe with an outer diameter of 22 mm and a wall thickness of 1.2 mm. The dotted line ( . . . ) shows the temperature profile in the pipe without thermal insulation material (5) and without heat reservoir layer according to the prior art. The dashed line ( - - - ) shows the temperature profile with thermal insulation (5) made of commercially available PIR foam with a layer thickness of 50 mm according to the prior art. The dash-dot ( - - - ) shows the temperature profile of the pipe (4) encased by a heat reservoir composite (51) made of commercially available PIR foam with a layer thickness of 50 mm and a 10 mm thick layer of heat reservoir layer (1), wherein a time-limited ceiling of the pipe temperature in the region of the melting temperature of the latent heat reservoir material (2) is clearly visible; see Example 5 and Table 1 for further details.

By using the heat reservoir composite (51) according to the invention with heat reservoir layer (1) only 10 mm thick, the cooling time from 60° C. to the set limit (fine, dotted and horizontal line) of 48° C. can be increased from 1.5 h to 7 h.

FIG. 4 shows, analogously to FIG. 3, the measured temperature profiles of water with a flow temperature of 60° C. after flow interruption in a stainless-steel pipe with an outer diameter of 54 mm and a wall thickness of 1.5 mm.

The dotted line ( . . . ) shows the temperature profile in the pipe without thermal insulation material (5) and without heat reservoir layer according to the prior art. The dashed line ( - - - ) shows the temperature profile with thermal insulation (5) made of commercially available PIR foam with a layer thickness of 50 mm according to the prior art. The dash-dot line ( - . - ) shows the temperature profile of the pipe (4) encased by a heat reservoir composite (51) made of commercially available PIR foam with a layer thickness of 50 mm and a 5 mm thick heat reservoir layer (1). The dash-dot-dot-dash line ( - . . - ) shows the temperature profile of the pipe (4) encased by a heat reservoir composite (51) made of commercial PIR foam with a layer thickness of 48.75 mm and a heat reservoir layer (1) 6.25 mm; see Example 5 and Table 1 for further details. If the pipe (4) is surrounded by the heat reservoir composite (51), a time-limited ceiling of the pipe temperature in the region of the melting temperature of the latent heat reservoir material (2) is clearly visible.

By using the heat reservoir composite (51) according to the invention with only 5 mm thick heat reservoir layer (1), the cooling time from 60° C. to 48° C. can be increased from 3.7 h to 6.75 h. If a 6.25 mm thick heat reservoir layer (1) is used, the cooling time from 60° C. to the set to the set limit (fine, dotted and horizontal line) of 48° C. can even be increased to 8.75 h.

Figure 5:
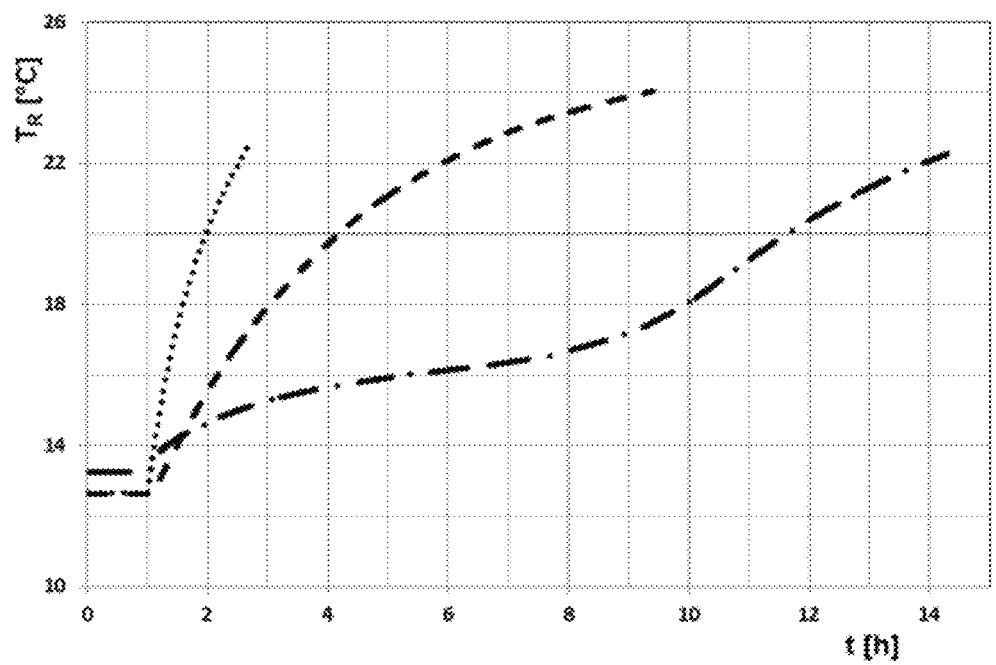
FIG. 5 shows, analogously to FIG. 3, the measured temperature profiles of water with a flow temperature of 12 to 13° C. after flow interruption in a stainless-steel pipe with an outer diameter of 22 mm and a wall thickness of 1.2 mm.

FIG. 5 shows, analogously to FIG. 3, the measured temperature profiles of water with a flow temperature of 12 to 13° C. after flow interruption in a stainless-steel pipe with an outer diameter of 22 mm and a wall thickness of 1.2 mm.

The dotted line ( . . . ) shows the temperature profile in the pipe without thermal insulation material (5) and without heat reservoir layer according to the prior art. The dashed line ( - - - ) shows the temperature profile with a thermal insulation (5) made of commercial PIR foam with a layer thickness of 30 mm according to the prior art. The dash-dot line ( - . - ) shows the temperature profile of the pipe (4) encased by a heat reservoir composite (51) made of commercially available PIR foam with a layer thickness of 50 mm and a 5 mm thick heat reservoir layer (1); see Example 5 and Table 1 for further details.

By using the heat reservoir composite (51) with only 5 mm thick heat reservoir layer (1), the warm-up time from 12 to 13° C. to the set limit (fine, dotted and horizontal line) of 20° C. can be increased from 55 minutes to 10.5 h.

Figure 6:
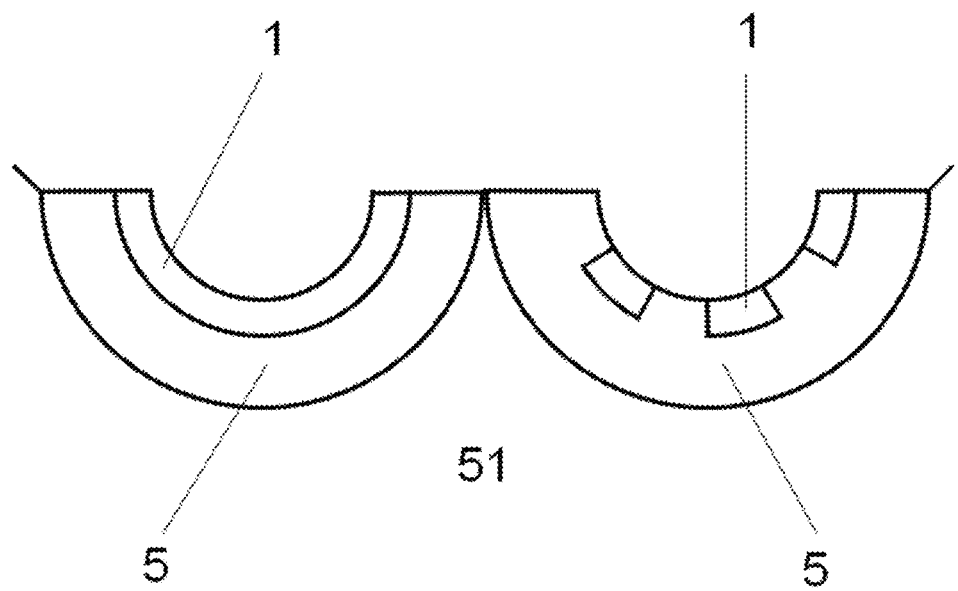
FIG. 6 shows an example of a heat reservoir insulation composite (51) in the form of a pipe shell. The two halves are surrounded on the outside with a fibre-reinforced protective film by way of example, this being indicated by the protruding tabs on the left and right.

FIG. 6 shows an example of a heat reservoir insulation composite (51) in the form of a pipe shell. The two halves are surrounded on the outside with a fibre-reinforced protective film by way of example, this being indicated by the protruding tabs on the left and right. They are thus held together and can be conveniently placed around a pipe (4) having an outer diameter that ideally fits flush into the inner diameter of the pipe shell. The left embodiment of the pipe shell has a continuous heat reservoir layer (1), which is surrounded externally by a continuous layer of thermal insulation material (5), while the right-hand embodiment—as an exemplary embodiment—has three strips of the heat reservoir layer (1), which are received in recesses of the thermal insulation material (5). The heat reservoir layer (1) may be fastened to the thermal insulation material (5), for example by gluing, which is a preferred embodiment of the left heat reservoir insulation composite (51), i.e. pipe shell halves. Alternatively, the thermal insulation layer (1) can also be pressed in, for example, into recesses of the thermal insulation material (5) and thus can be mechanically fastened.

Figure 7:
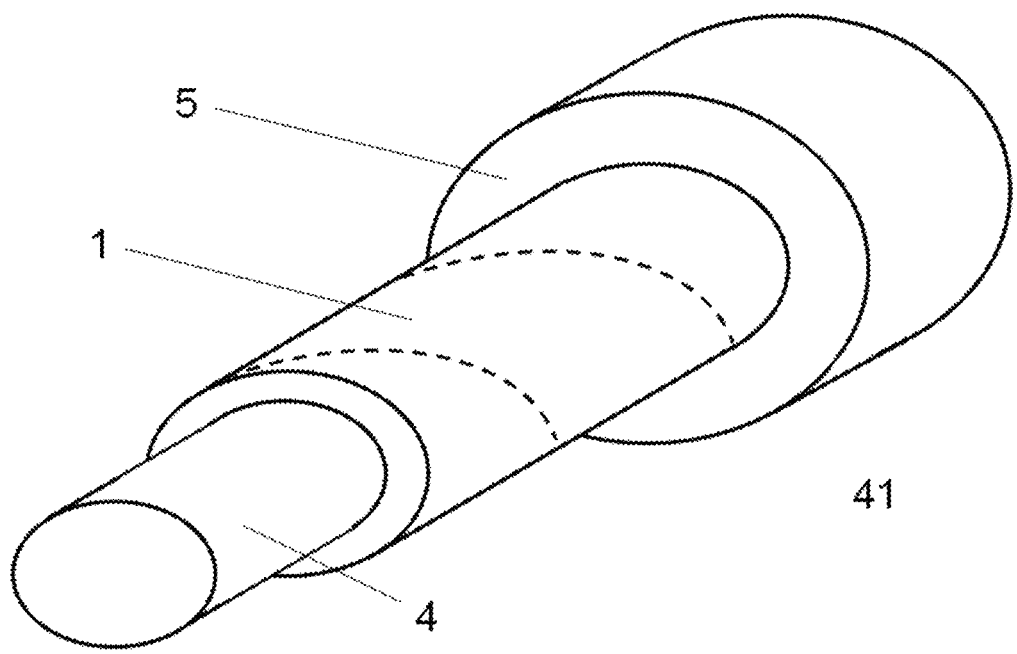
FIG. 7 shows by way of example a pipe (4), which is surrounded by an elongate rectangular heat reservoir layer (1) spirally.

FIG. 7 shows by way of example a pipe (4), which is surrounded by an elongate rectangular heat reservoir layer (1) spirally. Together they form the encased pipe (41) according to the invention. Thermal insulation material (5) is arranged thereabove and is placed around the encased pipe (41), for example in the form of a pipe shell made of thermal insulation material (5) or as a heat reservoir insulation composite (51). Alternatively, the encased pipe (4) can also be pushed into a tube made of thermal insulation material (5) or heat reservoir insulation composite (51).

Figure 8:
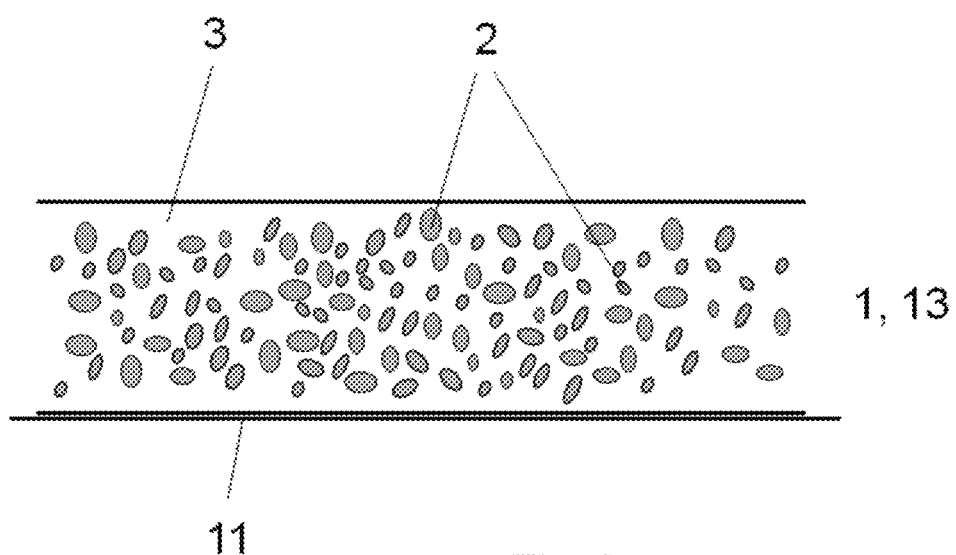
FIG. 8 shows an example of the heat reservoir layer (1) in the form of a composite (13) according to embodiment i)

FIG. 8 shows an example of the heat reservoir layer (1) in the form of a composite (13) according to embodiment i). On the lower side of the heat reservoir layer (1) there is attached a layer (11). Thus, for example, a composite (13) formed from matrix material (3) and latent heat reservoir material (2) and produced by means of extrusion can be applied to the layer (11) and shaped to form the heat reservoir layer (1). The latent heat reservoir material (2) is arranged in finely distributed domains within the matrix material (3), which typically forms a continuous phase in the composite (13).

Figure 9:
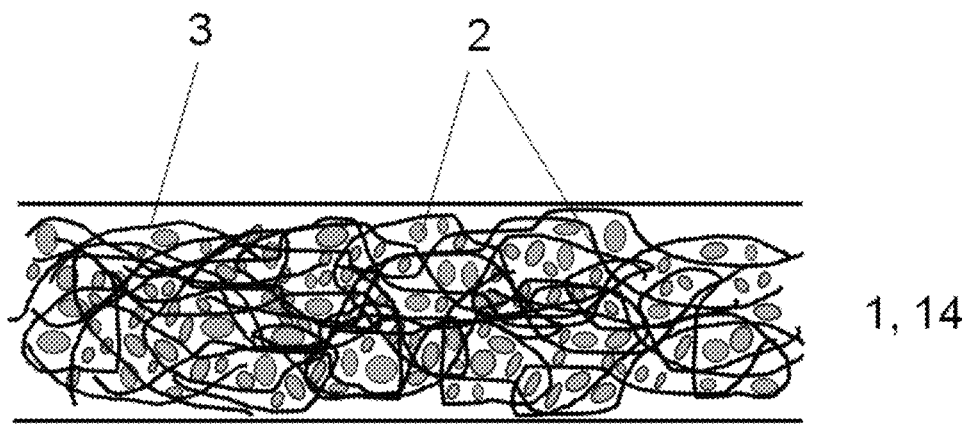
FIG. 9 shows an example of the heat reservoir layer (1) in the form of a composite (14) according to embodiment ii)

FIG. 9 shows an example of the heat reservoir layer (1) in the form of a composite (14) according to embodiment ii). On the lower side of the heat reservoir layer (1) there is also attached a layer (11). In the illustrated composite (14), the latent heat reservoir material (2) is absorbed in a non-woven.

Figures 10A, 10B:
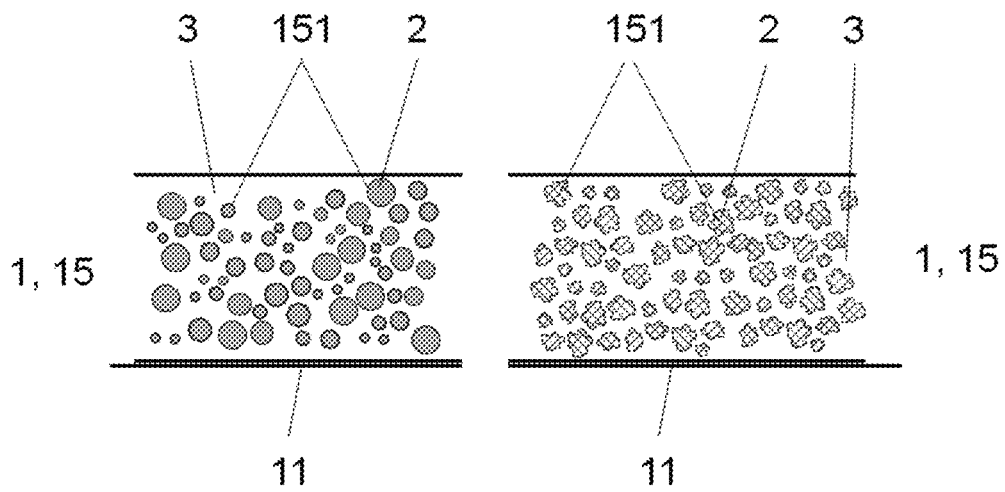
FIG. 10 shows an example of two embodiments of the heat reservoir layer (1) in the form of a composite (15), wherein both are arranged on a layer (11)

FIG. 10 shows an example of two embodiments of the heat reservoir layer (1) in the form of a composite (15), wherein both are arranged on a layer (11). In the continuous phase of the matrix material (3) there is distributed a powder and/or granular material (151), for example in the form of microencapsulated latent heat reservoir material (2), as shown in FIG. 10a, or in the form of powder or granular carrier material (151), on which latent heat reservoir material (2) is sorbed, as shown in FIG. 10b.

Figure 11:
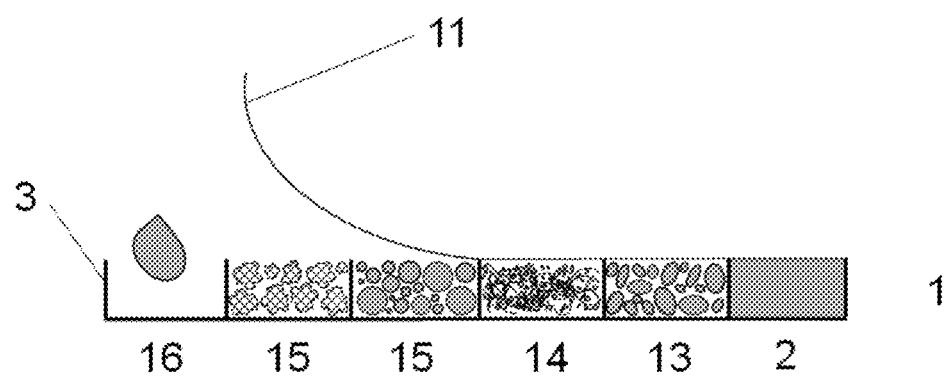
FIG. 11 shows an example of the matrix material (3) in the form of chambers.

FIG. 11 shows an example of the matrix material (3) in the form of chambers. For easier filling of the chambers, these may be initially open, for example, on one side. After filling, the chambers can then be covered with a layer (11) and thus sealed.

The chambers may be filled, for example, with pure latent heat reservoir material (2), with the composite (13), the composite (14), the composite (15) and/or the composite (16), which comprises a latent heat reservoir material (2) and a thickener and for example is present in the form of a highly viscous liquid, a gel, powder, granular material, flakes and/or paste. In FIG. 11, the last chamber is being filled with the composite (16).

The invention claimed is:

1. A method for maintaining the temperature of fluid media in pipes, even in the event that the fluid media flow is interrupted, wherein the pipes are suitable for building and home technology, building construction, as well as chemical and process facilities, the method comprising the steps of:
   a) a first step of producing a heat reservoir layer (1), the heat reservoir layer (1) comprising at least one latent heat reservoir material (2) and at least one matrix material (3), wherein, if the latent heat reservoir material (2) is present in the matrix material (3) in microencapsulated form, the matrix material (3) is a synthetic and/or natural polymer including a polymer based on olefinic monomers, acrylates, styrene and/or olefins; a block copolymer; a condensation polymer; a biopolymer, a protein, a polysaccharide, and/or a natural fiber; a carrier material; a thickener; and/or an adhesive, and
   b) a second step in which the heat reservoir layer (1) is either:
   b1) arranged around a pipe (4) and then the pipe (4) covered by the heat reservoir layer (1) is encased by the thermal insulation material (5) being in the form of a pipe shell or tube, whereby an encased pipe (41) is obtained, wherein the pipe (4) is produced from one material type and is thus a pipe having one layer and does not comprises pipelines or pipes for the petroleum or natural gas industry, wherein the thermal insulation material (5) has a thermal conductivity of ≤0.1 W/(mK), or
   b2) the heat reservoir layer (1) is brought into contact with the thermal insulation material (5), whereby a heat reservoir insulation composite (51) is obtained, and then the pipe (4) is encased by the heat reservoir insulation composite (51) so that the heat reservoir layer (1) of the heat reservoir insulation composite (51) comes to rest between the pipe (4) and the thermal insulation material (5) of the heat reservoir insulation composite (51).

2. The method according to claim 1, wherein in the at least one side of the heat reservoir layer (1) is covered by a layer (11), wherein the layer (11) comprises a paper layer, a plastic film including a polyethylene, PE, polypropylene, PP, polystyrene, PS, polyethylene terephthalate, PET, and/or plastic laminate film; a metal foil including an aluminum, copper, tin, zinc and/or steel foil; a metal-plastic layer, and/or a laminate, wherein the layer (11) is reinforced with fibers including glass fibers, carbon fibers, and/or plastic fibers.

3. The method according to claim 1, wherein the heat reservoir layer (1) is:
 a composite (13), wherein the composite (13) is obtained by heating, mixing, and cooling at least one latent heat reservoir material (2), at least one matrix material (3), and optionally at least one nucleation additive, wherein the composite (13) is further processed to include fibers.

4. The method according to claim 1, wherein the amount of latent heat reservoir material (2) in the heat reservoir layer (1) is selected such that the solid/liquid heat capacity of the heat reservoir layer (1) within a temperature range of 10 K is at least 50 kJper kg of the heat reservoir layer (1) and is measured by DSC according to EN ISO 11357-1 (2016), and EN ISO 11357-4 (2016).

5. The method according to claim 1, wherein the heat reservoir layer (1) comprises:
 30 to 95 wt % latent heat reservoir material (2),
 5 to 70 wt % matrix material (3), and
 0 to 20 wt % other components.

6. The method according to claim 1, wherein the latent heat reservoir material (2) has a melting point between −182° C. and +175° C.

7. The method according to claim 1, wherein the latent heat reservoir material (2) comprises at least one organic compound including a hydrocarbon, paraffin, alcohol, glycol, polyol, sugar, ketone, ester, ether, carboxylic acid, fatty acid, amide, a sulphur, phosphorus; and/or a nitrogen compound; and/or an inorganic compound including an inorganic salt, salt hydrate, water, and/or an aqueous mixture.

8. The method according to claim 1, wherein the pipe (4) is a glass pipe; a metal pipe including a brass pipe, steel pipe, stainless steel pipe, aluminum pipe, and/or copper pipe; and/or a plastic pipe including a pipe made of PVC, acrylic glass, polyurethane, polycarbonate, polybutadiene, and/or composite materials.

9. The method according to claim 1, wherein the thermal insulation material (5) is based on expanded polystyrene (EPS), extruded polystyrene (XPS), polyurethane (PUR), polyisocyanurate (PIR), phenol resin (PF), flexible elastomer foam (FEF), polyethylene foam (PEF), urea formaldehyde resin foam (UF), rigid PVC foam, polyurethane spray insulation, rubber, styrene-butadiene rubber (SBR), ethylene-propylene-diene rubber (EPDM), mineral fiber, mineral foam, mineral wool (MW), rock wool, glass wool, foam glass (CG), expanded clay, perlite and expanded perlite (EPB), vermiculite and expanded vermiculite, aerated concrete, wood fiber insulation board (WF), wood wool insulation board (WW), cellulose insulation (CI), cork, ground cork, cork board and cork insulation board (ICB), microporous insulation material, aerogel, vacuum insulation panel (VIP), vacuum insulation and/or insulation materials of animal and/or plant origin, insulation boards of sheep wool, reed boards, coconut fiber matting and/or flat fiber boards.

10. The method according to claim 1, wherein the heat reservoir insulation composite (51) is present in the form of a closable pipe shell, which may optionally be surrounded by a film, or by a fiber-reinforced protective film.

11. The method according to claim 1, wherein the heat reservoir layer (1) is a composite (14);
 wherein the composite (14) comprises the latent heat reservoir material (2) absorbed on the matrix material (3);
 wherein the matrix material (3) is a non-woven, a woven fabric, and/or a flat porous material;
 wherein the non-woven and/or woven fabric comprises fibers which are produced from the composite (13).

12. The method according to claim 1, wherein the heat reservoir layer (1) is a composite (15) comprising:
 a powder and/or granular material (151) connected to at least one matrix material (3), in particular, an adhesive;
 wherein the powder and/or granular material (151) is present in the form of a microencapsulated latent heat reservoir material (2) and/or the latent heat reservoir material (2) is absorbed on a porous powder and/or a granular carrier material.

13. The method according to claim 1, wherein the heat reservoir layer (1) is a composite (16) comprising:
 the latent reservoir material (2) and a thickener;
 wherein the composite (16) is present in the form of a highly viscous liquid, a gel, powder, a granular material, flakes, and/or a paste.

14. The method according to claim 1, wherein the heat reservoir layer (1) comprises:
 a plurality of chambers formed of the matrix material (3),
 wherein the chambers contain the latent heat reservoir material (2), wherein the latent heat reservoir material (2) is present in pure form, as a powder and/or granular material (151), as a composite (13, 14, 15, 16) or mixtures thereof.

15. A heat reservoir insulation composite (51) suitable for building and home technology and for process facilities, obtainable by:
 a first step including producing a heat reservoir layer (1), heat reservoir layer (1) comprising at least one latent heat reservoir material (2) and at least one matrix material (3), wherein, if the latent heat reservoir material (2) is present in the matrix material (3) in microencapsulated form, the matrix material (3) a synthetic and/or natural polymer including a polymer based on olefinic monomers, acrylates, styrene and/or olefins; a block copolymer; a condensation polymer; a biopolymer, a protein, a polysaccharide, and/or a natural fiber; a carrier material; a thickener; and/or an adhesive, and
 a second step, in which the heat reservoir layer (1) is brought into contact with thermal insulation material (5), whereby a heat reservoir insulation composite (51) is obtained.

16. A pipe (4) encased by the heat reservoir insulation composite (51) and suitable for building and home technology and for process facilities, wherein the pipe (4) is encased by the heat reservoir insulation composite (51) according to claim 12 so that the heat reservoir layer (1) of the heat reservoir insulation composite (51) comes to rest between the pipe (4) and the thermal insulation material (5) of the heat reservoir insulation composite (51), wherein the pipe (4) is a glass pipe, a metal pipe, a brass pipe, a steel pipe, a stainless steel pipe, an aluminum pipe or a copper pipe; or is a plastic pipe, a pipe made of PVC, acrylic glass, polyurethane, polycarbonate, polybutadiene, or composite materials.

17. A passive heat retention system for hot water conduits and/or cold retention system for cold water conduits in residential and office buildings and for chemical and process facilities comprising at least one pipe (4) encased by the heat reservoir insulation composite (51) according to claim 16.

18. An encased pipe (41) obtainable by:
- a first step including producing a heat reservoir layer (1), the heat reservoir layer (1) comprising at least one latent heat reservoir material (2) and at least one matrix material (3),
  wherein, if the latent heat reservoir material (2) is present in the matrix material (3) in micro-encapsulated form, the matrix material (3) a synthetic and/or natural polymer including a polymer based on olefinic monomers, acrylates, styrene and/or olefins; a block copolymer; a condensation polymer; a biopolymer, a protein, a polysaccharide, and/or a natural fiber; a carrier material; a thickener; and/or an adhesive, and
- a second step, in which the heat reservoir layer (1) is arranged around a pipe (4) covered by the heat reservoir layer (1) is encased by the thermal insulation material (5) being in the form of a pipe shell or tube, wherein the thermal insulation material (5) has a thermal conductivity of $\leq 0.1$ W/(mK), wherein an encased pipe (41) is obtained, wherein the encased pipe (41) is suitable for building and home technology and for process facilities, wherein the pipe (4) is a glass pipe, a metal pipe, a brass pipe, a steel pipe; or a plastic pipe, a pipe made of PVC, acrylic glass, polyurethane, polycarbonate, polybutadiene, or composite material.

19. A passive heat retention system for hot water conduits and/or cold retention system for cold water conduits in residential and office buildings and for chemical and process facilities comprising at least one encased pipe (41) according to claim 18.

* * * * *